United States Patent
Basdogan et al.

(10) Patent No.: US 6,704,694 B1
(45) Date of Patent: Mar. 9, 2004

(54) RAY BASED INTERACTION SYSTEM

(75) Inventors: Cagatay Basdogan, Pasadena, CA (US); Chih-Hao Ho, Cambridge, MA (US); Mandayam A. Srinivasan, West Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/418,715

(22) Filed: Oct. 15, 1999

Related U.S. Application Data
(60) Provisional application No. 60/104,634, filed on Oct. 16, 1998.

(51) Int. Cl.$^7$ ................................................ G06G 7/48
(52) U.S. Cl. ................................ 703/4; 703/6; 345/184
(58) Field of Search .................... 703/4, 6, 7, 13; 345/145, 184, 161, 149, 701, 702, 848–852, 771, 419

(56) References Cited

U.S. PATENT DOCUMENTS

| | | | |
|---|---|---|---|
| 5,694,013 A | * 12/1997 | Stewart et al. | 318/561 |
| 5,767,839 A | * 6/1998 | Rosenberg | 345/161 |
| 5,802,353 A | * 9/1998 | Avila et al. | 703/13 |
| 5,844,392 A | * 12/1998 | Peurach et al. | 318/568.17 |
| 5,889,670 A | * 3/1999 | Schuler et al. | 700/83 |
| 5,973,678 A | * 10/1999 | Stewart et al. | 345/184 |
| 6,028,593 A | * 2/2000 | Rosenberg et al. | 345/156 |
| 6,084,587 A | * 7/2000 | Tarr et al. | 345/419 |
| 6,088,020 A | * 7/2000 | Mor | 345/156 |
| 6,131,097 A | * 10/2000 | Peurach et al. | 707/102 |

OTHER PUBLICATIONS

Burns, "Design of a six degree of freedom haptic interface", a thesis to the Northwestern University for Master of Science in Engineering, Aug. 1996.*

Srinivasan et al., "Haptics in virtual . . . ", Jul.–Aug., 1997, pp. 393–404 (Abstract).*

Chih–Hao Ho et al., "Efficient Point–Based Rendering Techniques for Haptic Display of Virtual Objects", Massachusetts Institute of Technology, vol. 8, Oct. 1999, pp. 477–491.

Cagatay Basdogan et al., "Force Interations in Laparoscopic Simulations: Haptic Rendering of Soft Tissues", Proceedings of the Medicine Meets Virctual Reality VI Conference, San Diego, CA, pp. 385–391.

Jonathan Cohen et al., "I–Collide: An Interactive and Exact Collision Detection System for Large–Scale Environments", Proceedings of ACM Interactive 3D Graphics Conf., pp. 1–9.

Matthew Moore et al., "Collision Detection and Response for Computer Animation", ACM, Computer Graphics, vol. 22, No. 4, Aug. 1988, pp. 289–298.

C. B. Zilles et al., "A Constraint–Based God–Object Method for Haptic Display", IEEE International Conf. On Intelligent Robots and System, Human Robot Interaction, and Cooperative Robots, IROS, vol. 3, pp. 146–151.

Paul A. Millman et al., "Design of a Four Degree–of–Freedom Force–Reflecting Manipulandum With a Specified Force/Torque Workspace", IEEE International Conf. on Robotics and Automation, Sacramento, CA, pp. 1488–1493.

S. Gottschalk et al., "OBB–Tree: A Hierarchical Structure for Rapid Interference Detection", ACM, Proceedings of SIGGRAPH, Aug. 1996.

(List continued on next page.)

*Primary Examiner*—Kevin J. Teska
*Assistant Examiner*—K Thangavelu
(74) *Attorney, Agent, or Firm*—Daly, Crowley & Motford, LLP

(57) ABSTRACT

A ray-based interaction system and related techniques are described. The ray-based interaction system and rendering techniques can be used to display haptic interactions between objects having one or more dimensions and a haptic probe modeled as a line segment.

15 Claims, 17 Drawing Sheets

OTHER PUBLICATIONS

Pietro Buttolo et al., "Pen–Based Force Display for Precision Manipulation in Virtual Environments", Proceedings IEEE Virtual Reality Annual International Symposium, North Carolina, Mar. 1995, pp. 217–224.

Margaret Minsky et al., "Feeling and Seeing: Issues in Force Display", Proceedings of the Symposium on 3D Real–Time Interactive Graphics, 24, pp. 235–243.

Juhani Siira et al., "Haptic Texturing—A Stochastic Approach", Proceedings of the International Conf. on Robotics and Automation, Minneapolis, Minnesota, Apr. 1996, pp. 557–562.

Hiroo Iwata, "Pen–based Haptic Virtual Environment", Proc. VRAIS IEEE 1993, Seattle, pp. 287–292.

S. E. Salcudean et al., "On the Emulation of Stiff Walls and Static Friction with A Magnetically Levitated Input/Output Device", ASME/DSC, 55(1), 1994, pp. 303–309.

Elmar Schomer et al., "Efficient Collision Detection for Moving Polyhedra", ACM, $11^{th}$ Computational Geometry, Vancouver, B. C. Canada, ACM 0–89791–724–3/95/0006, 1995pp. 51–60.

Jason P. Fritz et al. "Stochastic Models For Haptic Texture", Applied Science and Engineering Laboratories (ASEL), Univ. of Delaware, Wilmington, DE.

Brian Mirtech et al., "Impulse–based Simulation of Rigid Bodies", Proceedings of Symposium on Interactive 3D Graphics, Apr. 1995, pp.

William A. McNeely et al., "Six Degree–of–Freedom Haptic Rendering Using Voxel Sampling", Computer Graphics Proceedings, Annual Conf. Series, 1999, pp. 401–408.

Ricardo S. Avila et al. "A Haptic Interaction Method for Volume Visualization", IEEE Proceedings of Visualization, 1996, pp. 197–204.

David Baraff, "Fast Contact Force Computation for Non-penetrating Rigid Bodies", ACM, Computer Graphics Proceedings, Annual Conference Series, SIGGRAPH, Orlando, Jul. 24–29, 1994, pp. 23–34.

Diego C. Ruspini et al., "The Haptic Display of Complex Graphical Environments", ACM, Computer Graphics Proceedings, Annual Conference Series, SIGGRAPH, 1997, pp. 345–352.

Yoshitaka Adachi et al., "Intermediate Representation for Stiff Virtual Objects", Proc. IEEE Virtual Reality Annual Int'l Symposium, Research Triangle Park, N. Carolina, Mar. 11–15, 1995, pp. 203–210.

Kenneth Salisbury et al., "Haptic Rendering of Surfaces Defined by Implicit Functions", Proceedings of the ASME, DSC–61, Nov. 15–21, 1997, pp. 1–8.

Kenneth Salisbury et al., "Haptic Rendering Programming Touch Interaction With Virtual Objects", Proceedings of the ACM Symposium on Interactive 3D Graphics, Monterey, California, 1995, pp. 123–130.

Ho, Chih–Hao et al. "Haptic–Rendering: Point–and Ray–Based Interactions", Proceedings of the Second PHANTOM Users Group Workshop, Public Oral Disclosure on Oct. 19, 1997.

* cited by examiner

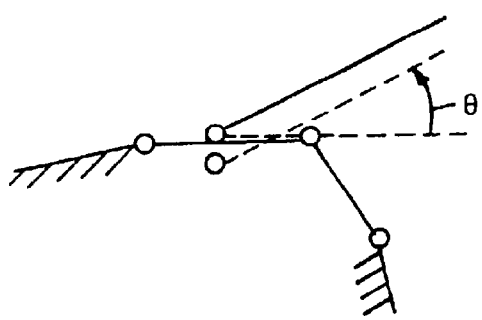
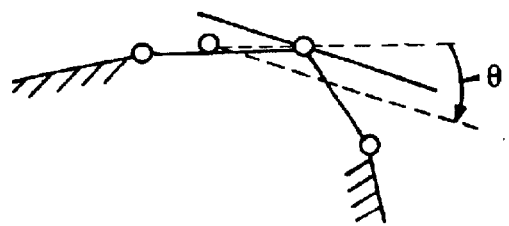
FIG. 12  FIG. 12A
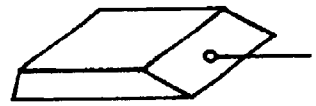
FIG. 13  FIG. 13A
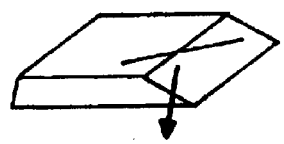
FIG. 13B  FIG. 13C

RAY BASED INTERACTION SYSTEM

CROSS REFERENCE TO RELATED APPLICATION

This application claims priority under 35 U.S.C. §119(e) from application No. 60/104,634 filed Oct. 16, 1998 and is hereby incorporated herein by reference in its entirety.

STATEMENT REGARDING FEDERALLY SPONSORED RESEARCH

This work was sponsored by the Office of Naval Research under Grant No. N61339-96-K-0002. The United States government may have certain rights in this invention.

FIELD OF THE INVENTION

The present invention relates generally to haptic rendering and more particularly to a ray-based haptic rendering technique for touching and feeling arbitrary three-dimensional (3D) polyhedral objects in virtual environments (VEs).

BACKGROUND OF THE INVENTION

As is known in the art, advances in virtual reality and robotics have enabled the human tactual system to be stimulated in a controlled manner through force-feedback devices, also referred to as haptic interfaces. A haptic interface is a device that enables manual interaction with virtual environments or teleoperated remote systems. Such systems are typically used for tasks that are usually performed using hands in the real world.

Force-feedback devices generate computer-controlled forces to convey to the user a sense of natural feel of the virtual environment and objects within it. In this regard, haptic rendering can be defined as the process of displaying computer controlled forces on the user to make the user sense the tactual feel of virtual objects.

Haptic interface systems typically include an end effector or probe with which the user interacts with the haptic interface system. Conventional haptic interface systems represent or model the probe as a single point in a virtual environment. Such haptic systems are thus referred to as point-based systems.

Through the single point representation of the probe, the user is able to explore the shape, surface details, and material properties of the virtual objects. Since the probe is represented as a point, the net force is the only haptic feedback that can be sent to the user. For exploring the shape and surface properties of objects in virtual environments (VEs), point-based techniques provide the users with force feedback similar to that which the users would experience when exploring the objects in real environments with the tip of a stick. While point-based haptic systems are computationally efficient, they only enable the user feel interaction forces, not the torques. Thus, one problem with the point-based techniques is that they fail to simulate tool-object interactions that involve multiple constraints.

To simulate real tool-object interactions, the computational model of the simulated tool cannot be reduced to a single point since the simulated tool must be able to contact multiple objects and/or different points of the same object simultaneously as does a real tool. Moreover, the resulting reaction torques have to be computed and reflected to the user to make the simulation of haptic interactions more realistic.

Several haptic rendering techniques have been developed to render 3-D objects. Just as in computer graphics, the representation of 3-D objects can be either surface-based or volume-based for the purposes of computer haptics. While the surface models are based on parametric or polygonal representations, volumetric models are made of voxels.

Although a single point is not sufficient for simulating the force and torque interactions between three-dimensional (3-D) objects, one approach to allow such simulation is to use a group of points. For example voxel-based approaches for six degree-of-freedom (6-DOF) haptic rendering have been proposed. In this approach, static objects in a scene are divided into voxels and the probe is modeled as a set of surface points. Then, multiple collisions are detected between the surface points of the probe and each voxel of the static object to reflect forces based on a tangent-plane force model. A tangent-plane whose normal is along the direction of the collided surface point is constructed at the center of each collided voxel. Then, the net force and torque acting on the probing object is obtained as the summation of all force/torque contributions from such point-voxel intersections. Although this approach enables 6-DOF haptic interactions with static rigid objects, its extension to dynamical and deformable objects would significantly reduce the haptic update rate because of the computational load. Moreover, it is difficult to render thin or small objects with this approach.

Another problem with conventional point-based and voxel-based systems, however, is that they do not allow realistic representations of side collisions such as a collision between an object and a portion of the probe other than an end point. Such systems also fail to provide realistic representations of tools having a length such as surgical instruments, for example.

It would, therefore, be desirable to provide a haptic system in which the probe is not modeled as a single point. It would also be desirable to provide a haptic system which computes forces due to collisions between different portions of the probe and one or more virtual objects. It would further be desirable to provide a haptic system which computes and displays reaction forces and torques. It would be still further desirable to provide a ray-based haptic rendering technique that enables the user to touch and feel objects along the length of a probe.

SUMMARY OF THE INVENTION

A force-feedback system includes a probe modeled as line segment or ray in a virtual environment.

With this arrangement a ray-based force-feedback system which provides representations between an object and a portion of the probe including but not limited to an end point is provided. The system can thus provide a realistic representation of a tool, such as a surgical instrument, having a length. By connecting a pair of force-feedback devices, the ray-based force-feedback system of the present invention provides a system in which the user is exposed to torques in addition to the forces, both of which are essential in simulating tool-object interactions. By allowing a user to explore an object with a probe having a length, the haptic perception of some 3D objects using the ray-based rendering technique of the present invention is better than the existing point-based techniques.

The ray-based haptic rendering technique of the present invention enables the user to touch and feel convex polyhedral objects with a line segment model of the probe. The ray-based haptic rendering technique of the present invention not only computes the forces due to collisions between the probe and virtual objects, but also the torques that are required to be displayed in simulating many tool-handling applications. Since the real-time simulation of haptic interactions (force/torque) between a 3D tool and objects is computationally quite expensive, ray-based rendering can be considered as an intermediate step towards achieving this goal by simplifying the computational model of the tool. By modeling the probe as a line segment and utilizing the ray-based rendering technique of the present invention, users have a more rapid haptic perception of 3D convex objects than when the probe is modeled as a point.

Haptic systems which model a probe and objects using ray-based techniques have several advantages over the conventional haptic systems which model probes using point-based techniques. First of all, side collisions between the simulated tool and the 3D objects can be detected. Thus, a user can rotate the haptic probe around the corner of the object in continuous contact and get a better sense of the object's shape. Second, ray-based rendering provides a basis for displaying torques to the user. Using the ray-based rendering technique, one can compute the contact points, depth of penetration, and the distances from the contact points to both the ends of the probe. Then, this information can be used to determine the forces and torques that will be displayed to the user. Third, the ray that represents the probe can be extended to detect the collisions with multiple layers of an object. This is especially useful in haptic rendering of compliant objects (e.g. soft tissue) or layered surfaces (e.g. earth's soil) where each layer has different material properties and the forces/torques depend on the probe orientation. Fourth, it enables the user to touch and feel multiple objects at the same time. If the task involves the simulation of haptic interactions between a tool and an object, ray-based rendering provides a more natural way of interacting with objects. Fifth, the reachable haptic workspace can potentially be extended using this technique since the technique allows full control of forces and torques that are displayed to the user. This means that it may be possible to create an illusion of touching distant objects by virtually extending the length of the probe and appropriately changing the direction and magnitude of the reflected forces.

For example, in performing minimally invasive surgeries, the surgeon inserts thin long rigid tubes into the body of the patient through several ports. Small size instruments attached to these tubes are used for manipulating internal organs. During surgery, the surgeon accesses the targeted area by pushing the organs and surrounding tissue aside using the instruments and feels both the interaction forces and torques. A point-based technique is inadequate to fully simulate such haptic interactions between surgical instruments and virtual organs. If the instrument is modeled as a single point, the side collisions of an instrument with organs will not be detected and the instrument will pass through any organ other than the one touching the tip. In addition, multilayered and damaged tissues whose reaction forces depend on the tool orientation can be simulated using the ray-based technique if the ray is extended along the contacted surface and multiple collisions with the layers of the virtual object are detected to compute interaction forces.

Another example where the ray-based rendering is preferable would be the simulation of assembly line in car manufacturing. A scenario may involve a mechanic going under a virtual car and turning nuts on an engine block. Some of these procedures are done through mechanical instruments attached to a long and rigid shaft which enables the mechanic to reach difficult areas of the engine. Typically, the vision is limited and the mechanic finds his way around using haptic cues only. Moreover, the path to the nuts is usually blocked by several other mechanical components which makes the haptic task even more challenging. The simulation of this procedure in virtual environments will certainly involve the modeling of torques and detection of multiple collisions simultaneously since a long rigid shaft is used to reach the targeted areas.

In accordance with the present invention, the probe is represented as a ray or line segment for the purpose of collision detection. The haptic interaction system described herein as ray-based haptic rendering includes means for allowing interaction along a ray or a line segment or segments rather than only at a point as in prior art techniques. The system also includes means for rapid computation of collisions between an end-effector (or generic probe) of a haptic device and one or more three-dimensional (3D) objects in a scene. With this particular arrangement, a ray-based haptic interaction system capable of haptically rendering side collisions and tools having a length is provided. The system and techniques can also provide additional haptic cues for conveying to the user the shape of objects.

The haptic interaction paradigm of the present invention as described herein enables a user to touch and feel 3-dimensional polygon-based objects in virtual environments via a haptic interface. In this regard, the technique of the present invention computes these forces and enables the user to touch and feel arbitrarily shaped 3D objects in a synthetic environment as if they exist and as if they are being touched with a probe which has a length (rather than simply being a point). Using the interface device and the developed methods and techniques, a system user feels as though they are touching invisible objects. The ray-based haptic interaction technique of the present invention differs from previously developed techniques since the technique of the present invention utilizes interactions between a finite ray (i.e. a line) and virtual objects rather than between a point and virtual objects. This feature enables the computation of torques, detection of side collisons, and simulation of tool-object interactions in a more realistic manner than heretofore.

The haptic interaction technique works with force reflecting haptic interfaces and enables the user to feel the forces that arise from interactions between simulated instruments and objects. In order to demonstrate the practical utility of the developed techniques, a force-reflecting device developed at the Artificial Intelligence Laboratory of MIT, (referred to as a PHANToM,) was used as the haptic interface. This device is now available in the market through SensAble Technologies, Inc. It is a low friction force-feedback device which can fit on a desk-top and contains 3 motors which control translational forces exerted on the user's finger tip. A pencil shaped probe (stylus) or a thimble can be used as the end effector held by the user.

In ray-based haptic interactions of the present invention, the generic probe of the haptic device is modeled as finite ray having a particular orientation and the collisions are checked between the ray and the objects. The collision detection techniques return the collision point, which is the intersection point between the ray-based probe and the object. In the point-based case, the only possible collision situations are point-point, point-line, and point—polygon collisions. However, the collisions in the ray-based case can in addition be line-point, line-line, line-polygon collisions. The ray based haptic rendering technique of the present invention allows representations of side collisions that can provide to the user more cues about the shape of the object than those provided through only tip collisions. There can also be multiple contacts composed of a combination of the above cases. Consequently, computations for ray-based interactions must handle more collision cases and are more complicated than in the point-based approach.

With the present technique, a new ray-based haptic interaction technique for rendering objects in VEs is provided. It should be noted that it is not necessary to utilize a new technique for detecting collisions between the haptic interface and the virtual objects. Rather a new paradigm that enables the user to interact with virtual objects via a ray rather than a point is provided. The major advantages of this paradigm are discussed below. It should be noted that the collision detection techniques (e.g. point-polygon, line-line, line-polygon, etc.) used in the ray-based haptic interactions have been intelligently blended with a rule-based methodology for collision response.

Some advantages of interacting with a probe modeled as a line segment rather than a point are as follows. The ray-based rendering technique of the present invention considers the interactions between the line segment model of the probe and the virtual objects. In the ray-based rendering technique of the present invention, the probe is modeled as a line segment rather than a single point, hence, the side collisions between the probe and the virtual objects can be detected. This enables the user to feel the forces that arise from side interactions. Also, multiple collisions can be detected using ray-based rendering technique. This enables us to haptically render multi-layered structures (i.e. the ray will collide with each layer of structure) or to touch and feel multiple objects in the scene at once (i.e. the ray will collide with multiple objects). The total force that will be reflected to the user can be calculated simply by adding up the forces resulting from each collision.

Additionally, torque (i.e. force multiplied by distance) can be calculated using a ray-based rendering technique. A pair of PHANToMs connected to opposing ends of a probe can convey to the user feeling of torques about some axes. Other haptic devices can also convey to the user feeling of torques about some axes. Furthermore, it is expected that progress will be made in hardware development in the future and more sophisticated rendering techniques will be required to display both forces and torques. In this regard the ray-based technique described herein makes the first steps towards rendering torques in virtual environments. In view of the disclosure of the ray-based technique of the present invention, the concepts and techniques can be easily extended in the future to display torques when torque reflecting haptic interfaces become increasingly available. In one exemplary system, even with a single PHANTOM, some users feel the illusion of torques when interacting with multiple objects in virtual environments via ray-based haptic interaction technique. Although the PHANTOM can be used as a force feedback device, the techniques of the present invention are general enough to work with other types of force feedback devices that enable the user feel the forces that arise from interactions between a variety of simulated tools and objects.

The developed methods and techniques of the present invention are more suitable to simulation of "instrument-object" interactions (such as surgical instrument biological tissue interactions) than are prior art techniques. Prior art techniques consider forces that arise from only the position of the probe tip. In the present technique, the interaction forces using both probe tip and orientation are computed. As the user manipulates the probe of the PHANToM in real world, the techniques of the present invention detect the collisions between the simulated probe and the objects in virtual world in real-time. Since the orientation of probe is considered during the computation of collisions, the techniques of the present invention are more suitable to simulate the "instrument-object" interactions than existing ones.

The techniques of the present invention when combined with a haptic interface system can have several applications in areas including but not limited to medicine, telemedicine, computer animation, teleoperation (remote manipulation), entertainment, rehabilitation, education, training, design, manufacturing, marketing, hazardous operations, information visualization and teleconferencing. The techniques of the present invention can be used in virtual reality simulations as well as remote manipulation of objects where "hands-on" experience is important. For example, surgeons and medics use their hands frequently to manually explore the internal organs and tissues and to manipulate surgical instruments. The techniques of the present invention when used with a force feedback device can be used to train such medical personnel. Using the techniques described herein, the user can feel the forces that arise from "surgical instrument-biological tissue" interactions in virtual environments (e.g. one can use the probe of the force feedback device as the scalpel and make an incision on a virtual patient). The feeling of interaction forces provide a sensory feedback to the user about the precision of the incision and the characteristics of the tissue). In the area of remote manipulation and telerobotics, the techniques can be used to provide the operator of the telerobot with a sense of the reaction forces. This will increase the effectiveness of the operator in applications such as the control of remote devices and vehicles (e.g. handling of hazardous materials). In the area of entertainment, the techniques of the present invention provide a new way to interact with arbitrarily shaped 3D objects in virtual environments. It is also envisioned that this will result in the generation of more interactive and immersive computer games and simulations.

BRIEF DESCRIPTION OF THE DRAWINGS

The foregoing features of this invention as well as the invention itself may be more fully understood from the following detailed description of the drawings, in which:

FIGS. 12–12A are a series of views which illustrate possible future contacts between a virtual probe and a virtual object;

FIGS. 13–13C illustrate possible contact types if the projection of the probe does not have a collision with the face when there is a line segment-face contact in the previous cycle;

DESCRIPTION OF THE PREFERRED EMBODIMENT

Figure 1:
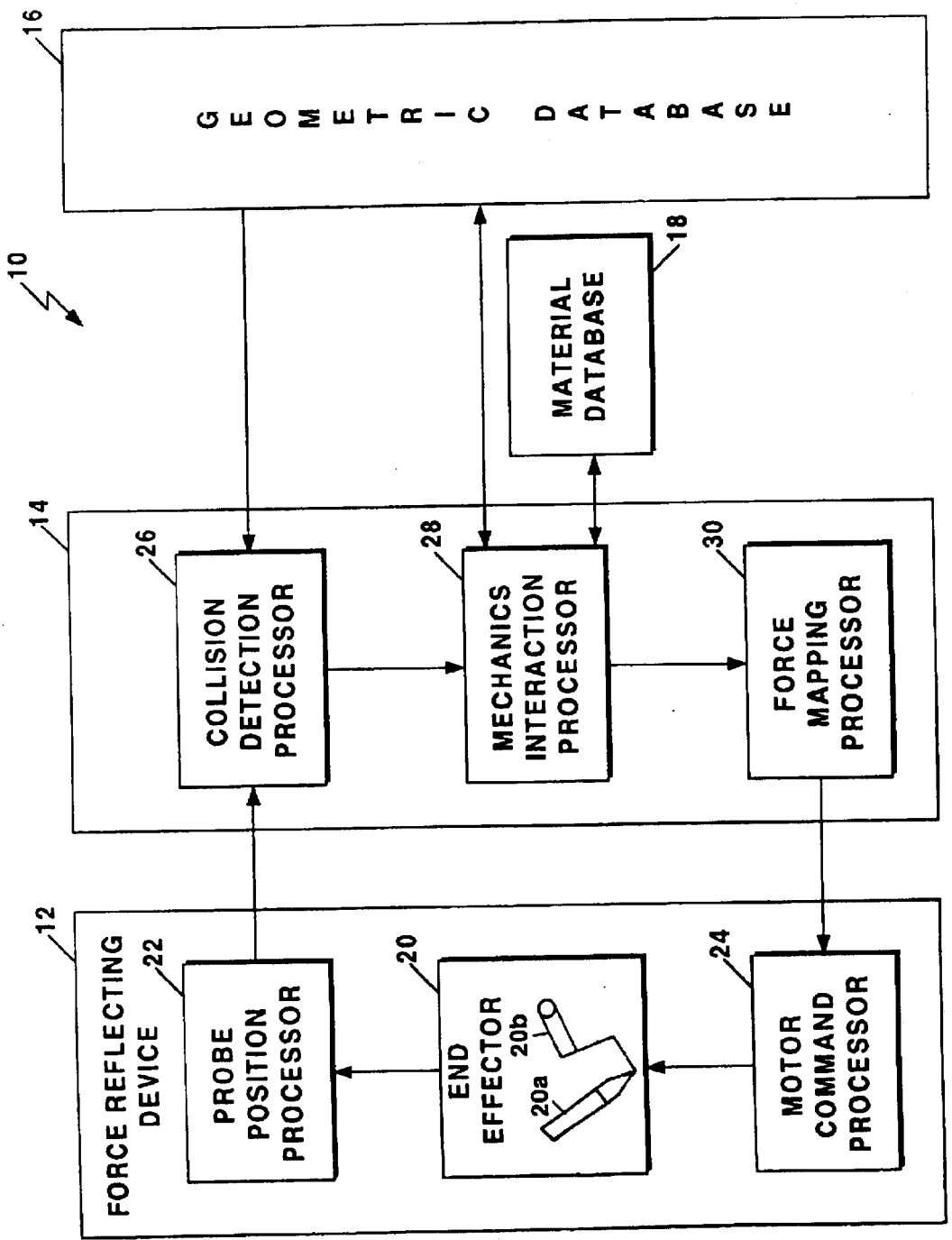
FIG. 1 is a block diagram of a haptic interface system which utilizes a ray-based probe.

Before proceeding with a detailed description of the invention, some introductory concepts and terminology are explained. Modeling refers to the use of constructive geometry and material behavior to generate or "build" three-dimensional (3-D) objects. Graphical rendering refers to the preparation of the representation of an image to include illumination, shading, depth cueing, coloring texture and reflection. Haptic rendering refers to the presentation of the touch and manual feel of an object including shape, texture and compliance. A virtual reality environment refers a computer-generated environment having one or more dimensions with which a user can actively interact using multiple sensory modalities such as vision, hearing and touch.

Reference is made herein to an "actual probe" or more simply a "probe." As used herein the term probe is intended to include any end effector or other mechanical structure including but not limited to a thimble, a stylus, a gripping tool, a cutting tool or the like. Thus, the term probe is intended to include any structure or portion of a structure which is gripped, held, attached to or otherwise interacted with by a user and through which the user interacts with a force-feedback system.

Reference is also made herein to a "virtual probe." As used herein the term "virtual probe" is intended to include any model or representation of an actual probe, in a virtual environment. Thus, the term virtual probe is intended to include any model or representation in a virtual environment of a structure or portion of a structure which is gripped, held or otherwise interacted with by the user.

The following description sets forth exemplary embodiments, in accordance with the present invention, of techniques for representing and rendering objects on a display which may, for example, be provided as part of a haptic system. It should be understood that the techniques of the present invention can be used in a variety of different applications including but not limited to computer graphics, computer haptics, multimodal virtual environments, computer aided design and computer aided manufacturing (CAD/CAM), virtual and teleoperated medical procedures and animation and the entertainment industry.

With respect to computer graphics and computer haptics, for example, the rendering of rigid and/or deformable media is of interest and the techniques described herein provide a consistent physically based method to render such media.

With respect to computer haptics (i.e. the representation and rendering of virtual solids and surfaces so far as touching or feeling them is concerned), a haptic interface device is typically required to obtain position and/or orientation information regarding the hands of a user. The user can then "interact" with objects in the virtual space as reaction forces arising out of such interactions are fed back to the user's hands through the same haptic interface device. For stability and perceptual reasons a haptic servo loop should be updated at a rate typically in the range of about 1–2 kHz. This calls for relatively rapid computation of reaction forces and which can be provided using the modeling approach of the present invention.

With respect to multimodal virtual environments, such environments are typically composed of a computer monitor and a haptic interface device and are intended to immerse the user in a synthetic world. One application of such systems is in a virtual surgery simulation, especially laparoscopic surgery simulation. When such a system is used for training purposes, the simulations need not only be in real time but also should mimic reality as closely as possible to give the user the closest approximation to reality. The proposed techniques may be used to generate real time physically based multimodal virtual environments which can be used for training of medical personnel.

With respect to computer aided design and manufacturing (CAD/CAM), a detailed modeling and solution of a part may not be required during initial modeling phases. In such a case, the techniques of the present invention may be used by a CAD/CAM engineer to rapidly generate results regarding the behavior of components in assembly or during a manufacturing process such as machining.

With respect to animation and the entertainment industry, with the increasing use of technology in the entertainment industry, the techniques described herein provide a relatively inexpensive, rapid and reliable way to work with animations.

Teleoperation refers, for example, to use of certain master-slave machine systems which operate in the real world. Typically, motions are affected based on conditions in the environment of the slave machine such as forces the slave machine encounters. The user grasping or otherwise contacting the master machine experiences constraints on the freedoms of motion that relate in some way to the environment of the slave machine. The master machine thus receives a force feedback signal. In applications in which either the master machine or another machine coupled between the master and the slave machines operates or makes use of a model, the techniques of the present invention find use.

Referring now to FIG. 1, a system 10 for haptically rendering objects in virtual environments includes a force-feedback or force reflecting device 12 coupled to a processor 14 and geometric and material databases 16, 18 coupled to the processor 14.

The force reflecting device 12 includes an end effector 20 which is handled by a user and which is coupled to a probe position processor 22 and a motor command processor 24. The end effector is provided as a probe 20a coupled though a probe coupling 20b to the probe position and motor command processors 22, 24. Coupling 20b may be provided for example as a mechanical structure.

The processor 14 includes a collision detection processor 26, a mechanics interaction processor 28 and a force mapping processor 30. The probe position and motor command processors 22, 24 of force reflecting device 12 are coupled to the collision detection processor 26 and the force mapping processor 30, respectively.

As the user manipulates the probe 20a, the new position and orientation of the probe 20a is sensed by encoders coupled thereto. Collisions between a simulated or virtual probe and virtual objects are detected by the collision detection processor 26. If the virtual probe collides with an object, the mechanics interaction processor 28 uses a mechanistic model to calculate an appropriate reaction force based on the penetration depth of the virtual probe into the virtual object. The calculated force vectors may then be modified by appropriately mapping them via force mapping processor 30 over the object surface to take into account the surface details. The modified force vectors are fed back to the user through the force-reflecting device 12.

Figure 1A:
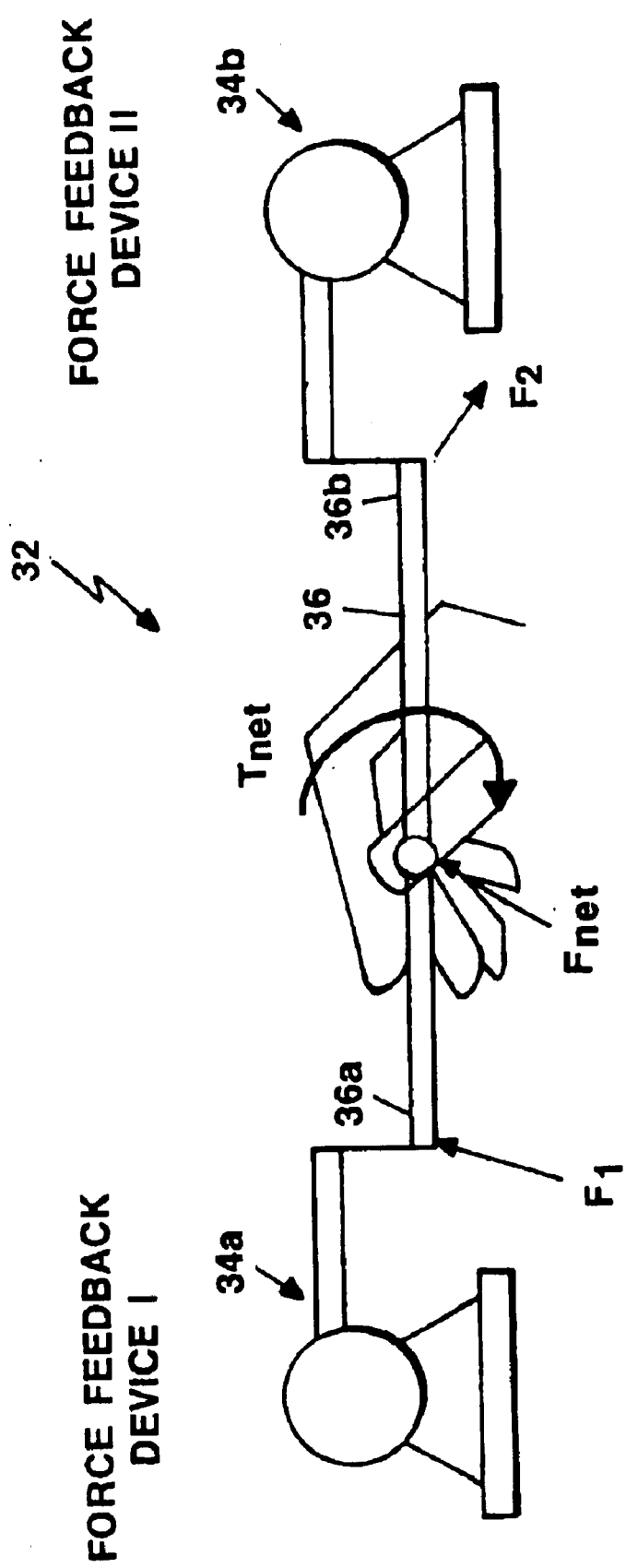
FIG. 1A is a schematic diagram of a haptic interface which includes two force feedback devices connected to each other through a rigid probe.

Referring now to FIG. 1A, a force reflection system 32 includes first and second force feedback devices 34a, 34b having a probe 36 coupled therebetween. A first end 36a of the probe 36 is coupled to the first feedback device 34a and a second end 36b of the probe 36 is coupled to the second force feedback device 34b. The system 32 thus includes two force feedback devices 34a, 34b connected to each other through the rigid probe 36. This enables the system to display to a user forces in three axes and torques about two axes (the torsion about the long axis of the probe cannot be displayed with this design). One system which can display or provide such torques when coupled with the present invention is the system described in "Pen-Based Haptic Virtual Environment," Proc. VRAIS IEEE 1993, Seattle, Wash. pp. 287–292, H. Iwata (hereinafter Iwata).

The typical functions of a haptic device are to acquire the position of the probe 36 and reflect forces back to the user. For given position information, a processor (such as processor 14 in FIG. 1) checks whether the probe in the virtual environment is inside the virtual objects or not. If it is determined that the probe is inside the virtual object, the processor sends force commands to motors of the force feedback device or devices to make the user feel the shape of objects. Typically, the user touches and manipulates objects in virtual environments through an end-effector of a haptic device. This end-effector could be a thimble in which a user's fingertip could be inserted, a stylus or a mechanical tool that could be held in the hand, or an actuated glove or exoskeleton that the user could wear all of which are referred to herein as a probe. Although the probes can have different physical shapes and designs, they can be modeled as one or more lines or line segments in virtual environments for simulating haptic interactions.

Figure 2:
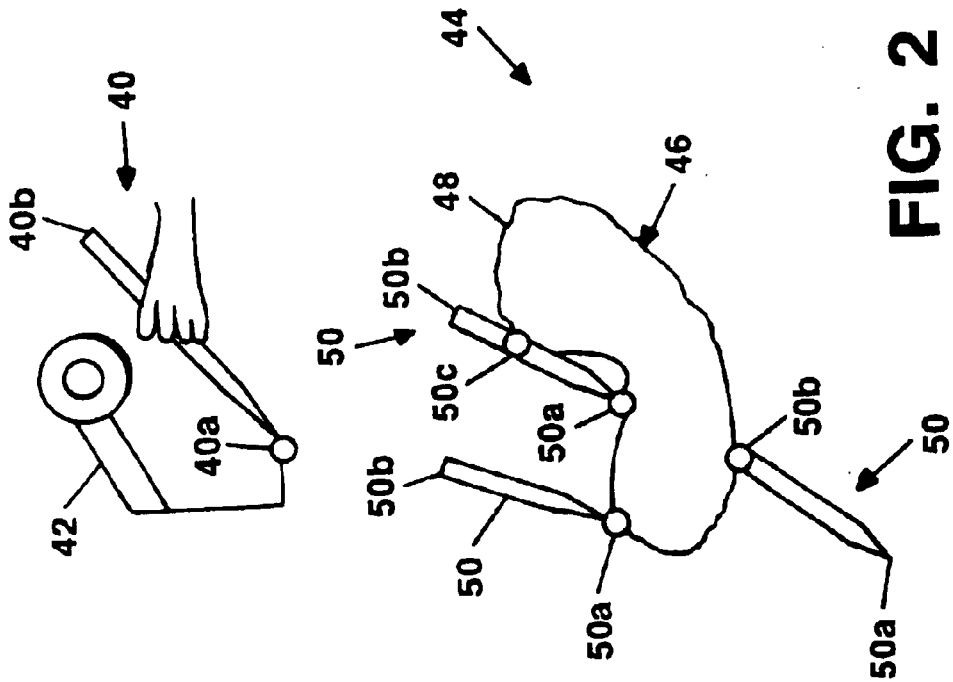
FIGS. 2 and 2A illustrate one difference between point- and ray-based rendering techniques.

Referring now to FIG. 2, a portion of a haptic system 38 is shown to include a probe 40 having a tip portion 40a, an end portion 40b and an intermediate portion 40c. The probe 40 is coupled to a force feedback device 42. The haptic system 38 also includes a display of a virtual environment 44. The virtual environment 44 includes a virtual object 46 having an outer surface 48. Also shown in the virtual environment 44 is a virtual probe 50 which is a ray-based or line segment model of the actual probe 40 in the virtual environment. The virtual probe 50 is thus provided having a tip portion 50a, an end portion 50b and an intermediate portion 50c corresponding to the tip, end and intermediate portions 40a, 40b, 40c respectively of the actual probe 40. The virtual probe tip portion 50a is disposed against the surface 48 of the object 46.

Figure 2A:
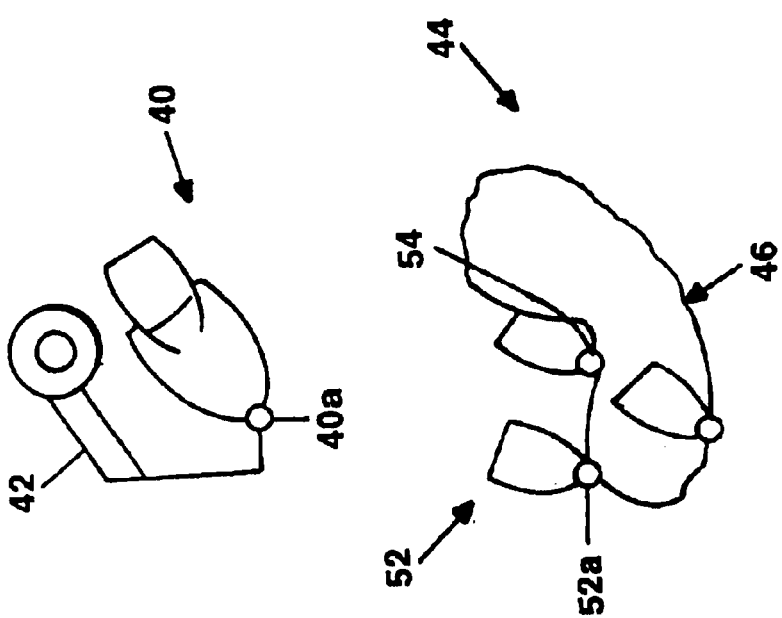

Referring briefly to FIG. 2A, in which like elements of FIG. 2 are provided having like reference designations, the probe 40 is shown coupled to the force reflecting device 42 and a virtual probe 54 is displayed in the virtual environment 44 which includes the virtual object 46. In this case, the probe 52 is modeled using a point-based technique rather than the ray-based technique of the present invention. Thus, the virtual probe 52 is provided having only a tip portion 52a.

Since the actual probe 40 is modeled as a point, as the probe 40 is moved such that the virtual probe 52 moves in the virtual environment 44, a portion 54 of the virtual probe 52 can move beyond the boundary surface 48 of the object 46 and into the object 46. This exemplifies one of the common unrealistic feelings manifested as a result of point-based modeling of the real probe 20 (e.g. a portion of the virtual probe such as probe portion 54 can go inside an object although the probe tip is outside the object).

Referring again to FIG. 2, since the virtual probe 50 is modeled using the line segment technique of the present invention, the virtual probe 50 contacts the surface 48 of object 46 in regions 48a, 48b. Thus, the second portion of the probe 30 does not move beyond the surface boundary 48 of the object 46.

By modeling the probe as a line segment, therefore, the problem described in conjunction with FIG. 2A above (i.e. allowing a portion of the probe to move inside an objects although the point of the probe is still outside the object) is eliminated. It should be noted that although the virtual probe 50 is shown contacting only two regions, those of ordinary skill in the art will now appreciate that more than two portions of the probe 50 could contact different portions of the object 46. For example, the entire probe 50 can contact the surface of the object 46. The line segment model of the probe is defined by connecting the tip and tail coordinates of the probe. In some applications the tip probe coordinate and tail probe coordinate will be connected by a straight line. In other applications, however, it may be desirable to connect tip and tail probe coordinates by something other than a single straight line. For example, a curved line made up of a plurality of straight line segments may be used.

In point-based haptic interactions, only the end point of the haptic device, also known as the end effector point or haptic interface point (HIP), interacts with objects. Since the virtual surfaces have finite stiffnesses, the end point of the haptic device penetrates into the object after collision. Each time the user moves the generic probe of the haptic device, a collision detection processor determines if the end point is inside the virtual object. If so, the depth of indentation can be calculated as the distance between the current HIP and a surface point, such as the nearest surface point.

In ray-based haptic interactions, the generic probe of the haptic device is modeled as a finite ray whose orientation is taken into account, and the collisions are checked between the ray and the objects. The collision detection processor (e.g. processor 26 in FIG. 1) identify the collision point, which can be the intersection point between the ray and the surface of the object.

In both point- and ray-based force reflection, the reaction force (F) can be calculated using the linear spring law, F=kx, where k is the stiffness of the object and x is the depth of indentation. For frictionless interactions, the reaction force (F) is normal to the polygonal face with which the generic probe collides. For rigid objects, the value of k is set as high as possible, limited by the contact instabilities of the haptic device.

In the ray-based haptic rendering technique for displaying 3-D objects in virtual environments of the present invention, the generic probe of the haptic device (stylus) is modeled as a line segment whose position and orientation are provided by encoder signals in a haptic interface. The graphical model of the simulated probe can be displayed and its tip and tail coordinates can be updated as the user manipulates the actual one, detect any collisions between the simulated stylus and the virtual object, estimate the reaction force typically by using the linear spring law, and finally reflect this force to the user via the haptic device.

The detection of collisions occurs in three consecutive steps: first, the collisions are detected between the virtual probe and a bounding box of the virtual objects in the scene, next a check is made for the collision between the virtual probe simulated stylus and the bounding box of each element. Finally, collisions between the virtual probe and the element itself are detected using computational geometry techniques. This multi-step collision detection technique significantly improves the update rate. Computations can be made even faster by utilizing space partitioning and advanced search techniques used in computer graphics.

Figure 3:
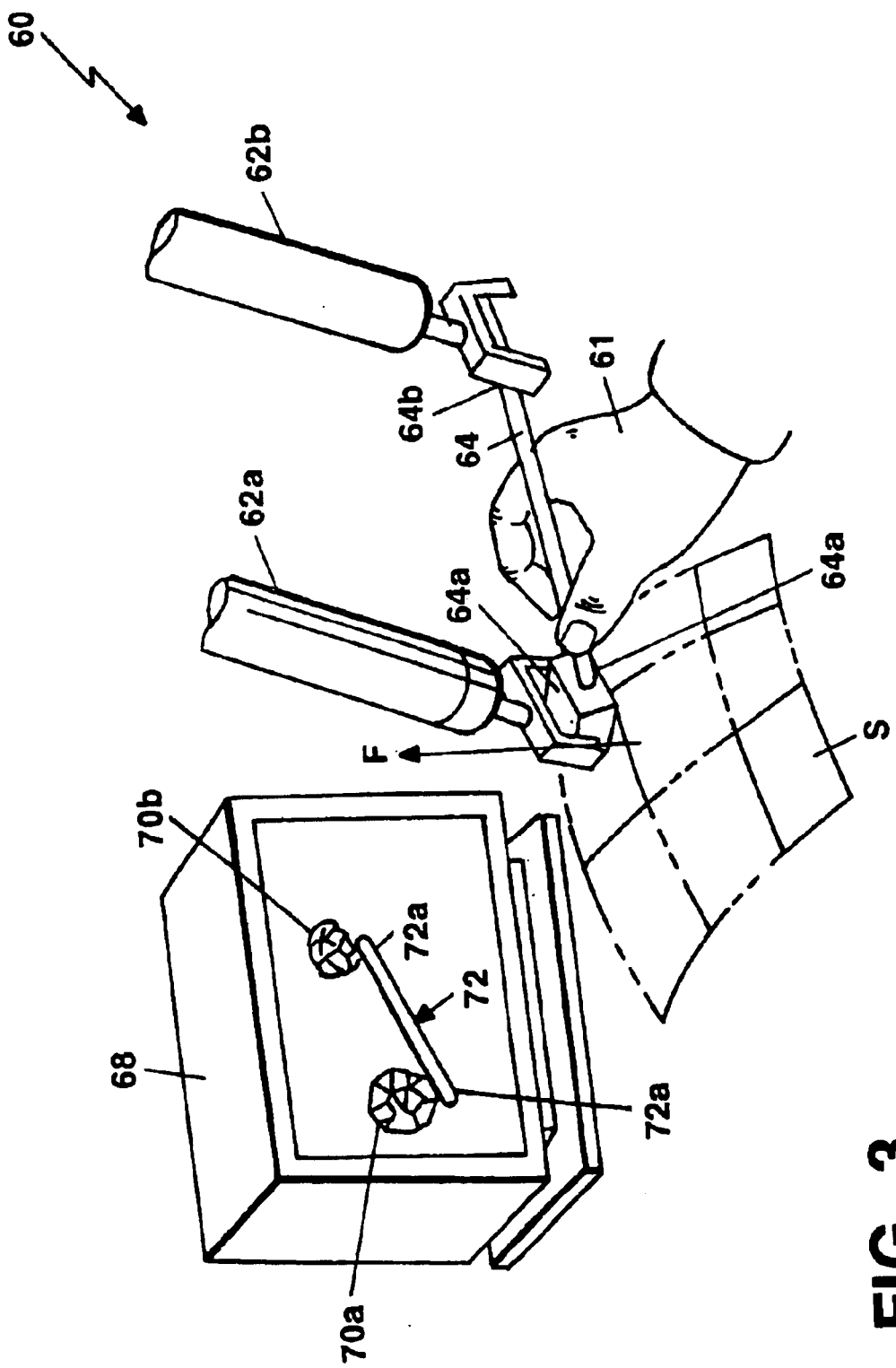
FIG. 3 is a perspective view of a portion of a system which includes a pair of force-reflecting devices for displaying forces and torques to the user using ray-based techniques.

Referring now to FIG. 3, haptic system 60 includes a pair of actuation mechanisms or force feed back devices 62a, 62b connected to opposing ends 64a, 64b of a probe 64 to convey to the user a sense of torques about some axes. A portion of a human operator 61 is shown grasping the probe 64. The force feedback devices 62a, 62b may, for example, be electrically connected to a processing station which includes a processor and display screen 68 for generating and displaying a design form or virtual environment, typically through use of conventional CAD, CAM or CAE programs. As used herein, the abbreviation "CAD" encompasses computer assisted design programs, including those from computer-aided manufacturing (CAM) and computer-aided engineering (CAE) facilities. In this particular example, a pair of design forms 70a, 70b are shown.

The design forms 70a, 70b can be a surface S which is displayed on a screen of the display 68, or the design forms can be viewed in a virtual reality viewing device (not shown) which may, for example, attach directly to the head of a user. A haptic interface for generating the sensations of rigidity and facial roughness of virtual objects, such as the surface of objects 70a, 70b, is provided through the actual probe device 64, which is here shown as a space pen or stylus attached to the force feedback devices 62a, 62b. In modeling of medical procedures, for instance, the devices 62a, 62b and stylus 64, in conjunction with the haptic interface method of the present invention, enable the designer to touch and feel complex, three-dimensional CAD geometry, thereby enhancing shape perception to the level that is, perhaps, only challenged by a physical prototype.

As shown in FIG. 3, a user can virtually interact with two objects 70a, 70b with the virtual probe 72. As shown, the two ends of the virtual probe 72a, 72b can simultaneously touch the two objects 70a, 70b. By coupling the probe 64 at two different points to one or more force feed back device or devices, the user can feel a torque. The ray-based haptic interaction technique of the present invention differs from previously developed techniques since it considers interactions between a finite ray 72 (i.e. a line segment) instead of a point and virtual objects 70a, 70b. This feature enables the computation of torques, detection of side collisions, and simulation of tool-object interactions in a relatively realistic manner.

The system 60 is capable of displaying torques as well as forces. In this particular implementation, the haptic devices 62a, 62b can be of the type provided as a commercially available product manufactured by SensAble Technology, Inc., Cambridge Mass. and identified as a PHANToM. Each of the PHANToMs 62a, 62b can sense six degrees of position information, but reflect forces along three axes only (i.e. torques cannot be displayed). However, if two PHANToMs 62a, 62b are connected to each other through the rigid probe 64, then a five degree of freedom (5-DOF) force/torque display can be obtained. This configuration can be implemented on a PC platform (a dual 300 MHz Pentium II processor) and can be used to implement ray-based rendering.

The software code for visual and haptic rendering of 3D polyhedral objects made of triangles is written with Open Inventor Graphics Tool Kit (TGS Inc.) and C++ programming language. Multi-threading techniques can be used to synchronize the visual and haptic loops to run the simulations in an efficient manner.

Although a PHANToM was used as the haptic device in this embodiment, those of ordinary skill in the art will appreciate that other haptic devices such as those described in Iwata, "Pen-Based Forced Display For Precision Manipulation in Virtual Environments," Proceedings IEEE Virtual Reality Annual International Symposium, North Carolina, March 1995, pp. 217–224, P. Buttolo and B. Hannaford and "Design of a Four Degree-Freedom Force Reflection Manipulandum With a Specified Force/Torque Work Space," IEEE International Conference on Robotics and Automation, Sacramento, Calif., 1991, pp. 1488–1493, P. Millman and J. E. Colgate. Other haptic devices may have of course also be used.

Figure 4:
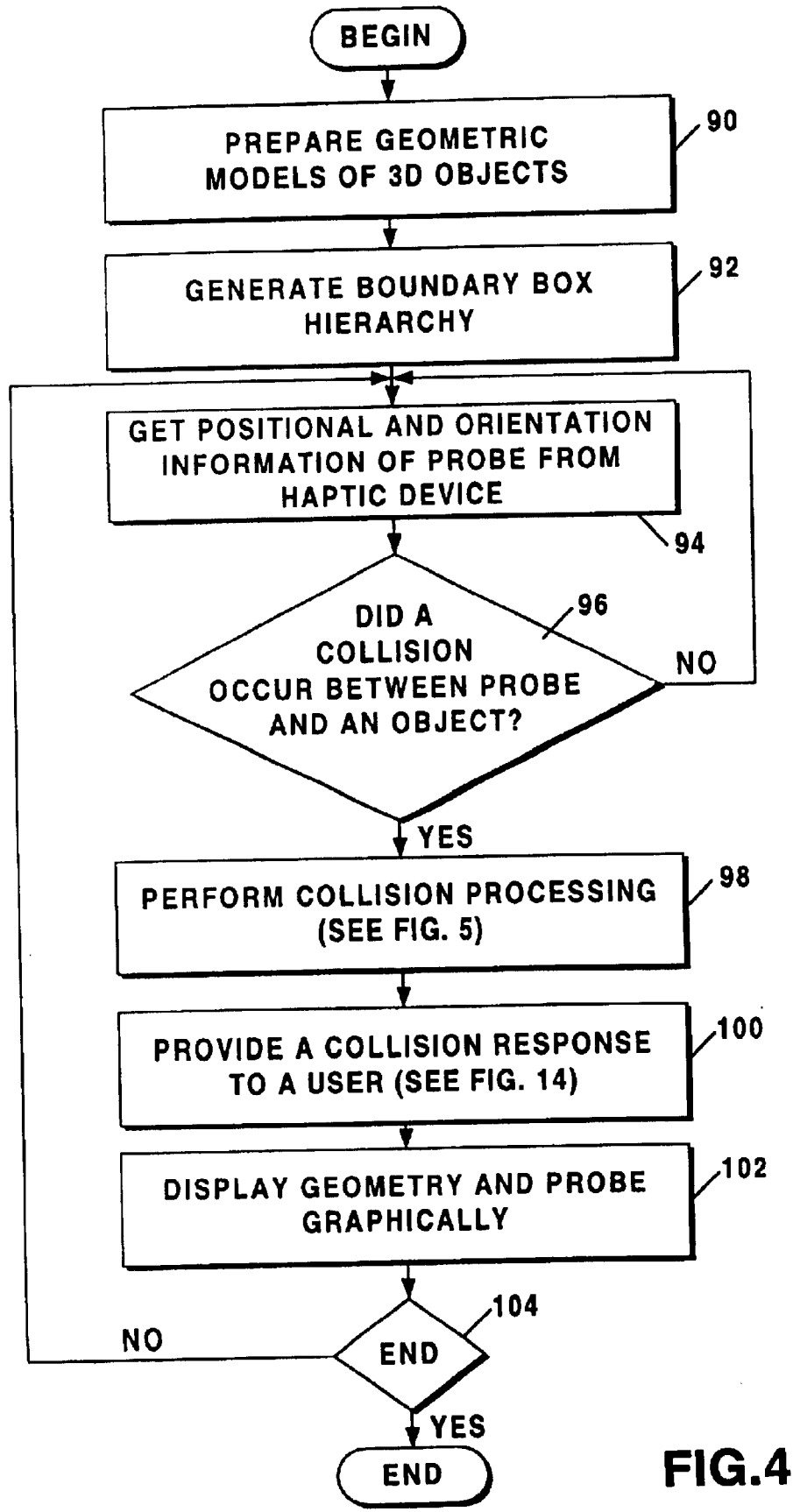
FIG. 4 is a flow diagram which shows the processing performed in a haptic system which utilizes ray-based techniques.
Figure 5:
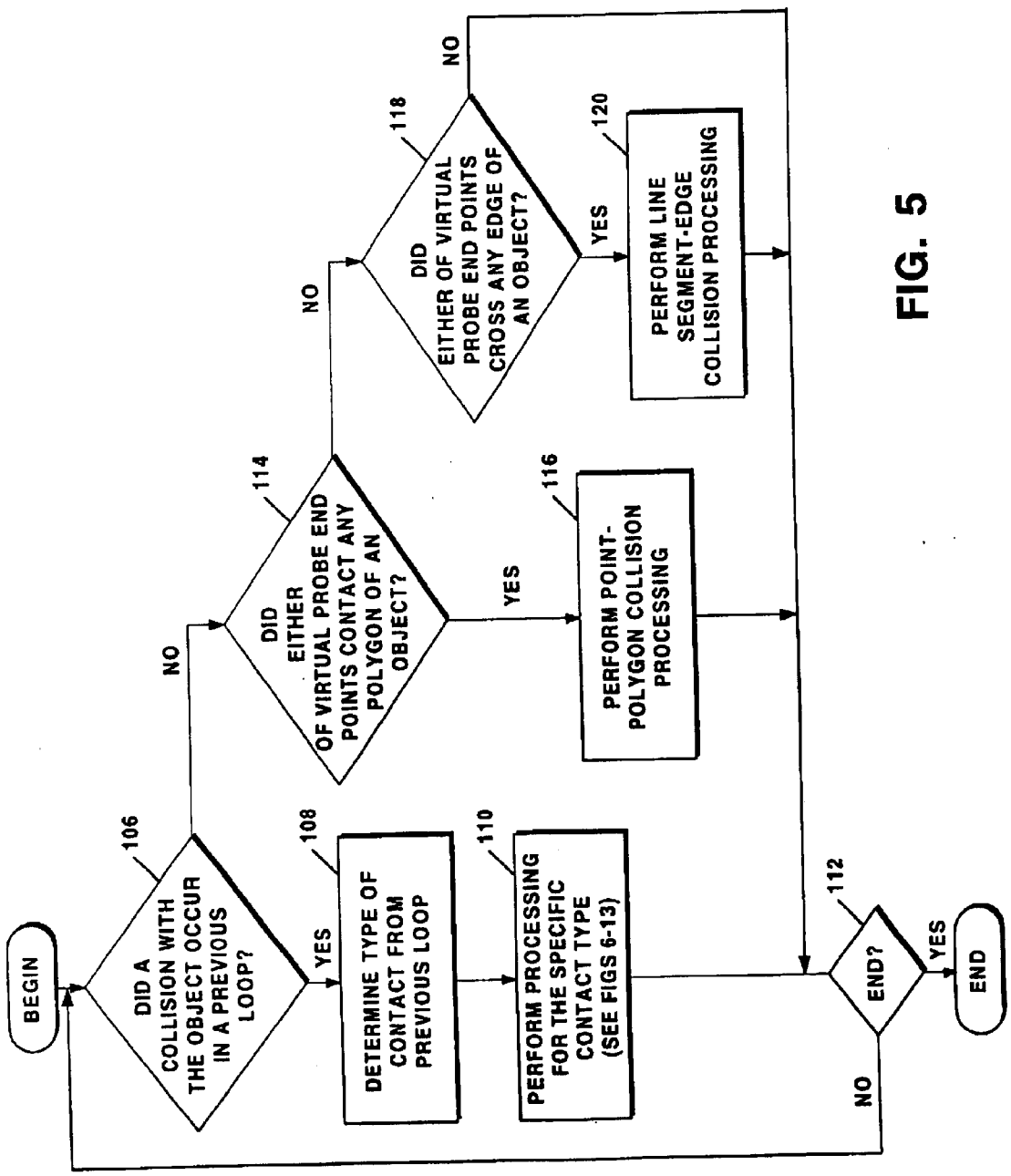
FIG. 5 is a flow diagram illustrating the steps to detect collisions between a line segment model if a probe and an object.
Figure 14:
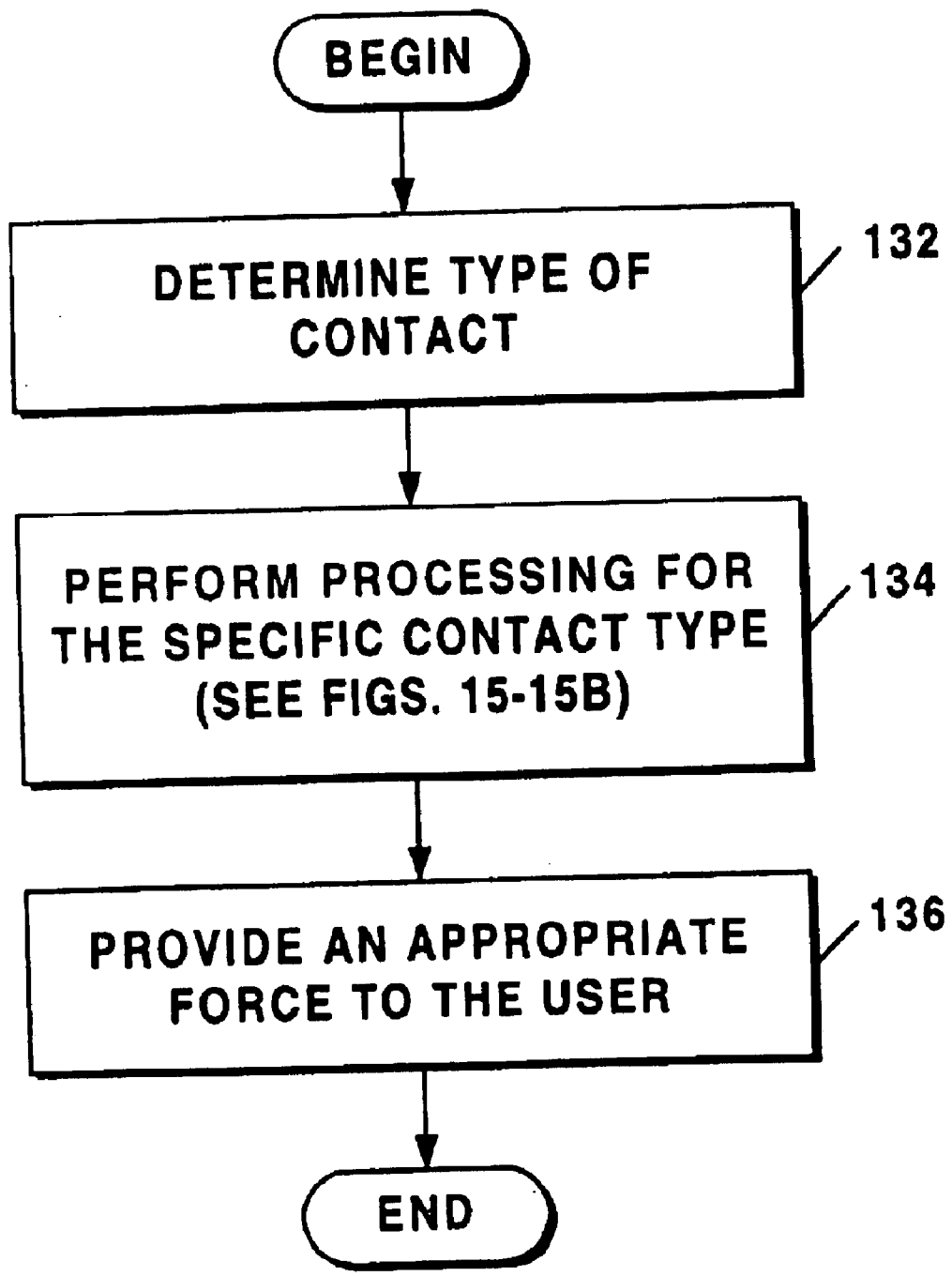
FIG. 14 is a flow diagram showing the steps to respond to a detected collision.

FIGS. 4, 5 and 14 are a series of flow diagram showing the processing performed by a processing apparatus which may, for example, be provided as part of a haptic system such as that shown in FIGS. 1–3. The rectangular elements (e.g. block 90 in FIG. 4) in the flow diagram(s) are herein denoted "processing blocks" and represent steps or instructions or groups of instructions. Some of the processing blocks can represent an empirical procedure or a database while others can represent computer software instructions or groups of instructions. The diamond shaped elements in the flow diagrams (e.g. block 96 in FIG. 13) are herein denoted "decision blocks" and represent steps or instructions or groups of instructions which affect the processing of the processing blocks. Thus, some of the steps described in the flow diagram may be implemented via computer software while others may be implemented in a different manner e.g. via an empirical procedure.

Alternatively, some of the processing blocks can represent steps performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to perform the steps or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Turning now to FIG. 4, processing begins in step 90 where graphical models of 3D objects are prepared.

Processing then proceeds to step 92 in which a hierarchical database is constructed.

After the above steps are performed, real time simulation phase processing begins and processing then flows from block 92 to processing block 94 where position and orientation information of the ray-based probe is retrieved from the haptic device. Processing then flows to decision block 96 where decision is made as to whether any portion of the ray-based probe has collided with and any portion of any object. The particular manner in which collisions can be detected is described below in conjunction with FIGS. 4A–4F. Suffice it here to say that if a collision is detected, then processing flows to processing block 98 where an appropriate response is provided to a user. If no collision is detected, then processing returns to block 94. Thus steps 94 and 96 implement a loop which is repeated until a collision is detected.

After a collision is detected, processing proceeds to step 98b where collision processing is performed and then to step 100 where an appropriate collision response is provided to a user. The collision and collision response processing steps are more fully described below in conjunction with FIGS. 5 and 14, respectively. Processing then flows to step 102 where the geometry of the object and the probe is displayed. Processing can then either end or repeat as shown in step 104.

Referring now to FIGS. 4A–4F, due to the relative complexity of tracking collisions in ray-based systems, in one embodiment, collisions between a line probe and convex objects are detected by a rule-based algorithm. Concave polyhedron objects can be divided into several convex objects.

To better describe the steps of the collision detection phase, reference is made herein to three different definitions of the haptic probe: (1) a real or actual probe which corresponds to the physical piece that is held by the user, (2) a simulated or virtual probe which corresponds to the computational model of the probe (i.e. the line segment model) that is defined by the tip and tail coordinates of the real probe; and (3) an ideal probe which corresponds to the ideal location of the virtual probe 82 that is constrained to stay on the surface when the virtual probe penetrates into an object.

The ray-based collision detection technique in the present invention follows a two-stage approach for detecting the collisions. First, an ideal probe follows the trace of the simulated probe. The simulated probe can penetrate the objects, but the ideal probe is constrained to stay on the surface of the object and to be always parallel to the simulated stylus. Second, it is assumed that there are two springs between the simulated stylus and the ideal stylus one between the tips and the other between the tails, respectively. This arrangement helps in computing torque in addition to the forces to be displayed to the users. It should be noted here that the only plausible collision conditions are point-polygon and line-line contacts because only convex objects are considered. The point-point, point-line, line-point, and line-polygon are all unlikely to occur, because at best they occur in a single servo loop. When implementing the technique of the present invention, one important aspect is to correctly position the ideal stylus.

Figure 4A:
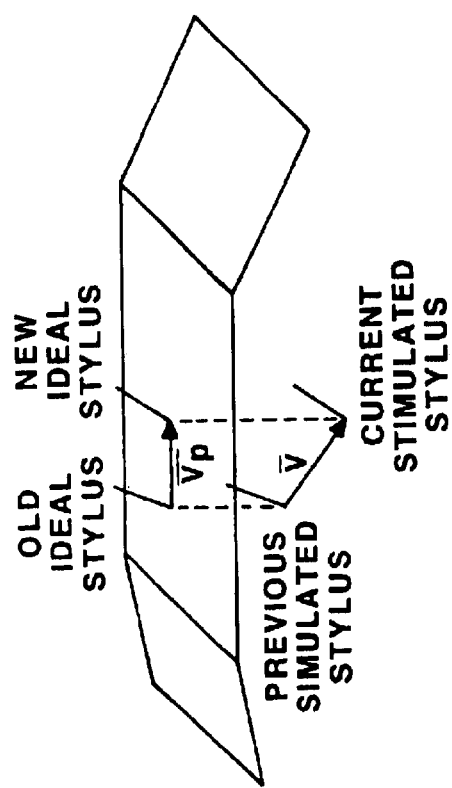
FIGS. 4A–4F are a series of views which illustrate possible collision scenarios between a virtual probe and a virtual object.
Figure 4B:
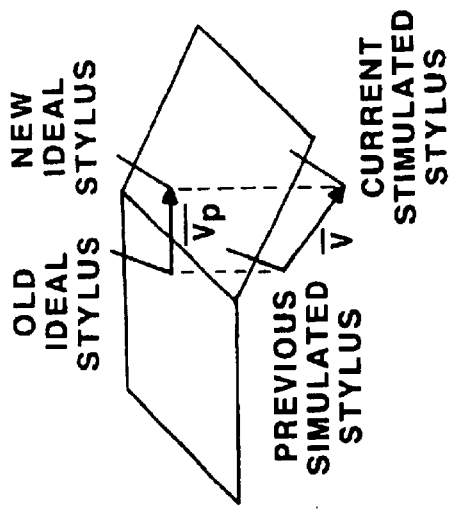

In the first stage movement, the first step is to find out whether the contacted primitive is a polygon or a line. If the contacted primitive is a polygon, the ideal stylus is moved along the surface. To do this, the movement (vector V) of the simulated stylus is first computed. Then a component (Vp) along the surface of the contacted polygon is computed. This is the vector that is used to move the ideal stylus as shown in FIGS. 4a and 4B. Vp may be computed as:

$$Vp=V-(V \cdot N)$$

Where N is the normal of the polygon.

Figure 4C:
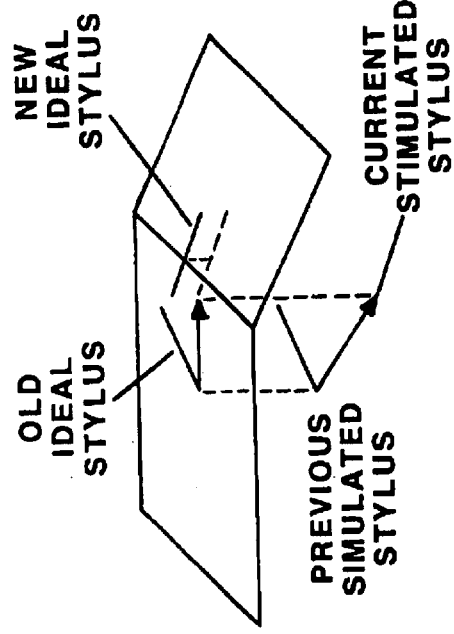

In this movement, if the new ideal stylus doesn't penetrate any line, the movement will be completed in this stage and the contacted primitive will still be set as a polygon. If the ideal stylus penetrates any of the lines, the ideal stylus is moved such that the new position of the ideal stylus will be at the position that has the shortest distance from the line to the current simulated stylus as shown in FIG. 4C. The contacted primitive will then be set as a line.

If the contacted primitive is a line, the ideal stylus is moved along the line. To do this, one must first find the point (say, point 1) which is at the contacted line and has the shortest distance from the line to the previous simulated stylus. Then, another point (say, point 2) is found which is also at the contacted line (or an extension of it) and has the shortest distance from the line to the current simulated stylus. After that, a vector (say, vector V1) which is from point 1 to 2 is obtained and this vector V1 is used to move the contact point of the old ideal stylus to the contact point of the new ideal stylus. The orientation of the ideal stylus, however, is always parallel to the simulated stylus.

Figure 4D:
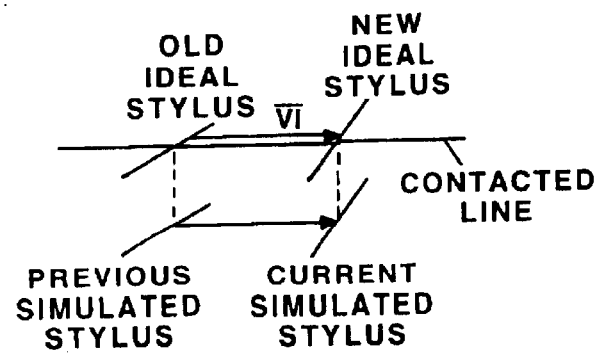

From the contact point, one could decide the new position of the ideal stylus (see FIG. 4D). If the new ideal stylus doesn't penetrate any polygon or line, the movement will be completed at this stage and the contacted primitive will still be a line.

Figure 4E:
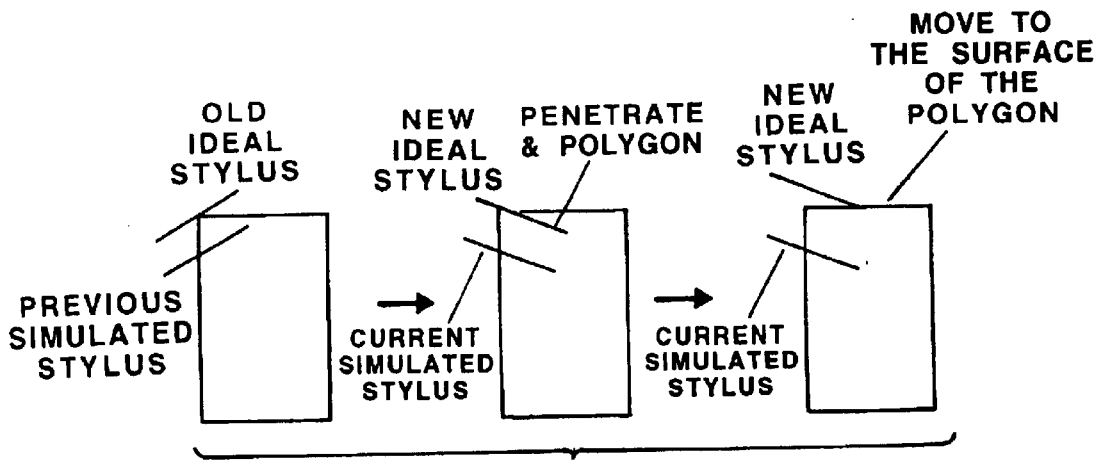
Figure 4F:
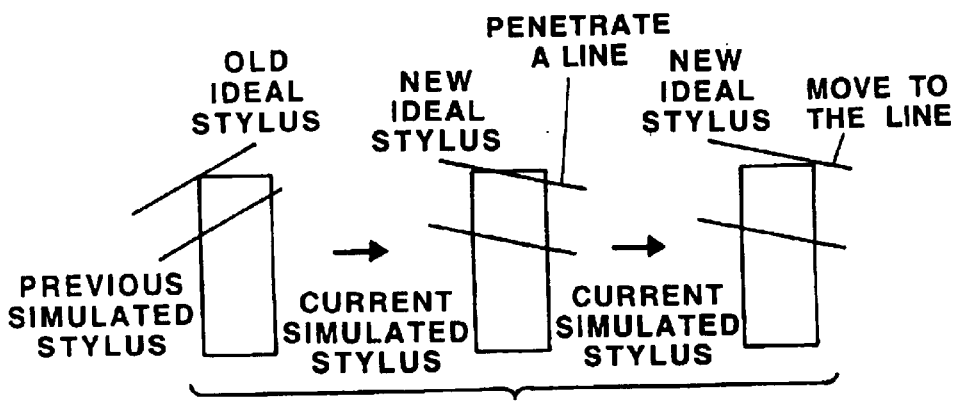

If the tip of the ideal stylus penetrates any of the polygons, its tip position will move to the surface of the polygon and the contacted primitive will be set as a polygon (see FIG. 4E). If the ideal stylus penetrates another line, the position of the ideal stylus will be moved to this line and the contacted primitive will be the new contacted line (see FIG. 4F).

In the second stage movement, the ideal stylus is moved towards the simulated stylus. If there is any line or polygon between the ideal stylus and the simulated stylus, the ideal stylus will be stopped at the first primitive it contacts. The pseudo code for the second stage movement is given below:

```
if(contacted primitive is a line)    else //(contacted primitive is a polygon)
{                                    {
   if(there is any line between ideal   if(there is any polygon between
stylus and simulated stylus)         ideal stylus and simulated stylus)
      move ideal stylus to the first    move ideal stylus to the first
contacted line, contacted =          contacted polygon, contacted = TRUE;
TRUE;
   if(there is any polygon between      if(there is any line between ideal
ideal stylus and simulated stylus)   stylus and simulated stylus)
      move ideal stylus to the first    move ideal stylus to the first
```

-continued

```
contacted polygon, contacted =     contacted line, contacted = TRUE;
TRUE;
    if(contacted = FALSE)           if(contacted = FALSE)
        move ideal stylus to the simu-    move ideal stylus to the simu-
lated stylus                       lated stylus
}                                  }
```

In this technique, a hierarchical data base is constructed such that each polyhedron is composed of vertices, lines, and polygons. Each vertex has neighbors that are lines and polygons. Each line has neighbors that are vertices and polygons. And each polygon has neighbors that are vertices and lines. In the hierarchical data base, each line and polygon also has a list of possible contacted neighbors. The possible contacted neighbors are those that can be potentially contacted in the next servo loop. Therefore, when checking the collision, only the primitives in this list need be checked instead of all of the primitives of the object. In this way, the computation time can be reduced and the servo rate can be made independent of the size of the polyhedron that represents the full object.

Referring now to FIG. 5, a flow diagram which illustrates the steps performed to detect a collision between a virtual probe and a virtual object begins with decision block 106 in which decision is made as to whether a collision occurred in a previous cycle or loop. One loop or cycle is defined by one traverse of precisional information from the end effector to the reflected force/torque to the end effector. For example, in FIG. 1, the loop would be represented by a path from end effector 20 through probe position processor 22 through collision detection processor 26 through mechanics interaction processor 28, force mapping processor 30, motor command processor 24 and returning again to end effector 20.

If there was a certain type of contact with the object in the previous cycle (i.e. a continuation of the previous contact) such as point-polygon, line segment-edge, or line segment-face, all the possible contact conditions for the upcoming loops are then considered. For example, if the contact type in the previous cycle was point-polygon, then the possible contact conditions for the current loop can be point-polygon, line segment-edge, or line segment-face. Each contact condition and the possible contact conditions that may follow it are discussed in detail below.

Figure 6B:
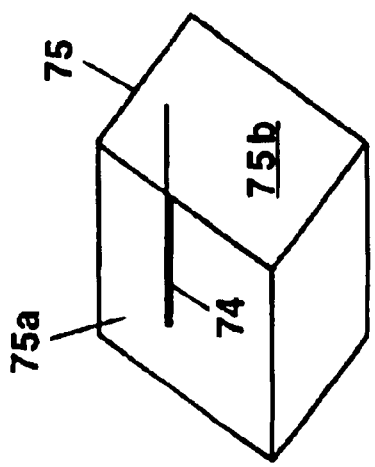
FIGS. 6–6B illustrate possible contact conditions for line segment-convex object interactions.
Figure 6A:
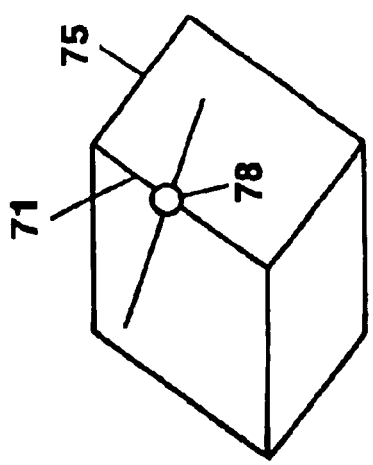
Figure 6:
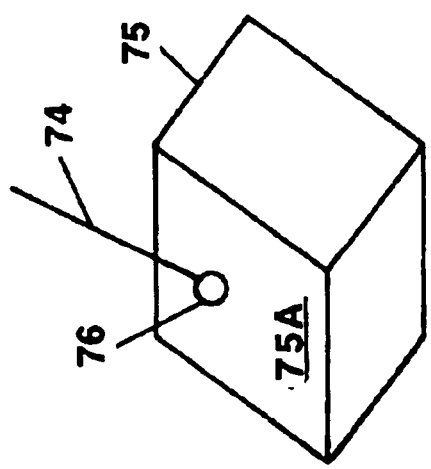

Thus, if in decision block 106 decision was made that there was contact with the object in the previous cycle, then processing flows to step 108 the type of contact from the previous loop is determined. As shown in FIGS. 6–6B below, possible contact conditions for the line segment-convex object interactions include: (a) probe contact with a polygon of an object at a single point—referred to as Point-Polygon contact (FIG. 6), (b) probe intersecting an edge of a convex object at a single point—referred to as Line Segment-Edge (FIG. 6A), (c) probe staying on the surface of a plane constructed from a single or multiple polygons and the intersection between the probe and the plane is either a portion or all of it—referred to as Line Segment-Face (FIG. 6B). It should be appreciated that in this particular example, the contact conditions are those for a line segment-convex object but in cases where a convex object is not used (e.g. a concave or other object is used) other contact conditions may occur. From the teachings provided herein, those of ordinary skill in the art will now recognize how to process such other contact conditions.

Processing then flows to step 110 where processing for the specific type of collision is performed. The particular processing steps which can be performed are described in conjunction with FIGS. 6–13.

Processing then flows to step 112 where decision is made whether processing should end or begin again at step 106.

On the other hand, if a decision is made in step 106 that a collision did not occur in a previous loop, processing flows to steps 114 and/or 118 which, determines if collisions occurred with any object. Briefly, to detect a collision, a first check is made to determine if the line probe is inside the top most bounding-box of the hierarchical tree generated in step 92 of FIG. 4. If the probe is inside the top most bounding-box, a determination is made as to whether any collisions with the bounding-boxes at the second level occurred. This process is repeated until the lowest level is reached by progressing along a particular branch of the tree. Finally, a check is made to determine if the line probe collides with the primitive itself (i.e. polygon or edge) that is inside the lowest-level bounding-box of this branch. If either of the end points of the virtual probe penetrates a polygon, then there is a point-polygon collision. If the virtual probe crosses any edge, a line segment-edge collision is encountered.

Thus, if in decision block 106 decision is made that there was no contact with the object in the previous cycle, then processing flows to step 114 where it is determined if the movement of end points of the line probe contact with any polygon of the object. This can be accomplished in the following manner. Assume a point is at point $P_1$ in time $t_1$ and at point $P_2$ in time $t_2$. A triangular polygon has vertices $P_a$, $P_b$, and $P_c$. The goal is to check if the movement of the point penetrates the triangular polygon. First, the normal $\vec{N}$ of the triangle which is equal to the cross product of the two vectors $(P_a-P_c)$ and $(P_b-P_c)$ is found and normalized. Next, a check is made to determine if there is an intersection between the line segment $(P_1, P_2)$ and a plane containing the triangle (the plane containing the triangle may be found using a technique described below). If there is an intersection, a check is performed to determine whether the intersection point is inside the triangle or not. If the intersection point is inside the triangle, the movement of the point penetrates the triangle.

To determine a plane containing the triangle for following technique can be used. Given a line segment $(P_a, P_b)$ and a plane with a unit normal $\vec{N}$ and another point $P_0$ on the plane, the goal is to determine the intersection point between this line segment and the plane. First, the signs of dot products $(P_a-P_0)\vec{N}$ and $(P_b-P_0)\vec{N}$ are checked. If any of them is equal to zero, then at least one of the points is on the plane. If both of them have the same sign, the two points $P_a$ and $P_b$ are on the same side of the plane and, therefore, there will be no intersection point. If the signs are different, the distances from the points $P_a$ and $P_b$ to the plane (say, $d_1$ and $d_2$, respectively) are calculated. The intersection point will be $(d_2*P_a+d_1*P_b)/(d_1+d_2)$.

If decision is made in decision block 114 that contact is made with a polygon of the object then processing flows to step 116 where point-polygon collision processing is performed. If decision is made in decision block 114 that contact is not made with a polygon of the object then processing flows to step 118 where it is determined whether either of the virtual probe end points crossed any edge of an object.

To determine if the movement of the line probe crosses any edge of the object the following technique can be used. At time $t_0$, the line segment $l_{ab}$ is at $l_{ab}(t_0)$ and at time $t_1$, it moves to $l_{ab}(t_1)$. The goal is to determine if the movement of $l_{ab}$ from $t_0$ to $t_1$ passes the line segment $l_{cd}$. One approach to providing an analytical solution can be found in Efficient Collision Detection for Moving Polyhedra, ACM, 11$^{th}$ Computational Geometry, Vancouver, B.C. Canada, ACM 0-89791-724-3/95/0006, Schomer and Thiel (1995). This method gives the exact solution for the collision time and the collision point. However, this solution is computationally too expensive to be used in haptic rendering since the haptic loop needs to be updated at about 1 kHz. Instead, the following simplified method can be used.

Although this method does not calculate the exact collision time and the collision point, it reports whether the movement of one line crosses the other. For this method to be valid, the translation and rotation of the line segment should be very small (this is absolutely the case in haptic rendering since the haptic loop is updated at about 1 kHz and the movements of our hand are quite slow). To detect the collision, a vector $\vec{D}_0$ which represents the nearest distance from $l_{cd}$ to $l_{ab}(t_0)$ is first calculated (one technique for performing this calculation is described below). Define the nearest points on the two lines as $P_{cd0}$ and $P_{ab0}$. Also calculated is the nearest distance vector $\vec{D}_1$ from $l_{cd}$ to $l_{ab}(t_1)$. The nearest points on the two lines can be defined as $P_{cd1}$ and $P_{ab1}$.

If (1) the dot product of $\vec{D}_0$ and $\vec{D}_1$ is negative, (2) neither $P_{cd0}$ nor $P_{cd1}$ are the end points of $l_{cd}$, (3) $P_{ab0}$ is not the end point of $l_{ab}(t_0)$, and (4) $P_{ab1}$ is not the end point of $l_{ab}(t_1)$, then the movement of $l_{ab}$ from $t_0$ to $t_1$ crosses the line segment $l_{cd}$ One technique for computing the vector $\vec{D}_0$ which represents the nearest distance from $l_{cd}$ to $l_{ab}(t_0)$ is next described. Two line segments $(P_a, P_b)$ and $(P_c, P_d)$ are defined in a 3D space. The goal is to calculate the nearest distance between the two line segments. To do so, the line segment $(P_a, P_b)$ is first projected to a plane that is parallel to the line segment $(P_a, P_b)$ and contains the line segment $(P_c, P_d)$ which will be $(P_a', P_b')$. This can be done using the following technique.

Two line segments $(P_a, P_b)$ and $(P_c, P_d)$ are defined in the 3D space. First, a vector $(\vec{N})$ that is perpendicular to the two line segments $(P_a, P_b)$ and $(P_c, P_d)$ (i.e. cross product of two vectors $(P_a, P_b)$ and $(P_c, P_d)$) is found and normalized. The plane parallel to the line segment $(P_a, P_b)$ and containing the line segment $(P_c, P_d)$ will have the unit normal $\vec{N}$ and the point $P_c$. The line segment $(P_a, P_b)$ is projected onto this plane to obtain the projected line segment $(P_a', P_b')$. To project the line segment onto the plane, the following method may be used. Given a line segment $(P_a, P_b)$, a plane with a unit normal $\vec{N}$ and another point $p_0$ on the plane, the goal is to calculate the projected line segment $(P_a', P_b')$ of the line segment $(P_a, P_b)$ on the plane. To project the point $P_a$ to the plane and obtain the projected point $P_a'$ the following technique may be used. Given a point p, a plane with a unit normal $\vec{N}$ and another point $p_0$ on the plane, the projected point p' of point p on the plane is calculated as p'=p+((p$_0$−p)·$\vec{N}$)$\vec{N}$. In the same way, one can obtain the projected point $P_b'$ of the point $P_b$. Then, the line segment $(P_a', P_b')$ is the projection of the line segment $(P_a, P_b)$ on to the plane.

Also calculated is the distance between the point $P_a$ and the plane, which is defined as $d_1$. The distance can be computed as follows: given a point p, a plane with a unit normal $\vec{N}$ and another point $p_0$ on the plane, the distance between the point p and the plane is calculated as d=‖(P$_0$−P)·$\vec{N}$‖.

Next the nearest distance $(d_2)$ between the two line segments $(P_a', P_b')$ and $(P_c, P_d)$ that are in the same plane are found. Then, the nearest distance between the two line segments will be the square root of $(d_1*d_1+d_2*d_2)$.

Thus, if decision is made in decision block 118 that either of the virtual probe end points crossed any edge of an object, then processing flows to step 120 where line segment—edge collision processing is performed. Processing then flows to step 112 where decision is made whether processing should end or begin again at step 106.

To speed up the collision detection calculations, two separate hierarchical trees are generated for each polyhedron in the scene during the pre-computation phase. One tree is generated for the polygons and another tree is generated for the edges of the object. At the top of the hierarchy is a bounding-box that covers the whole object. All of the geometric primitives inside the bounding-box are then separated into two groups based on their geometric centers. A bounding-box is then generated for each group. These two new bounding-boxes are placed under the first bounding-box in the hierarchy. This process is repeated to generate two children for each parent at each hierarchical level of the tree until there is only one primitive left in each bounding-box.

Referring now to FIGS. 6–6B, possible contact conditions for the line segment-convex object interactions are shown. In this particular embodiment, the objects are represented using polygons. It should be appreciated that objects may be represented using any shape including but not limited to rectangular, square, circular, triangular, truncated triangular or irregular shapes.

Briefly, in general three types of collisions occur when a convex object is explored with a line probe: (1) either end of the probe contacts with a polygon of the polyhedron and the intersection is a single point (FIG. 6); (2) the probe collides with an edge of the polyhedron and the intersection is a single point that is in between the end points of the probe (FIG. 6A); (3) The probe comes to a position in which it is perfectly parallel to a polygon or a set of polygons of the object and the intersection is a portion of the probe (FIG. 6B). Other types of contacts such as point-vertex, point-edge, and line segment-vertex are very unlikely to happen and will be covered by the three contact types mentioned above because the boundaries are included in the definition of edge and face.

In FIG. 6, a probe 74 contacts a polygon 75*a* of an object 75 at a single point 76 (referred to herein as a point-polygon contact).

In FIG. 6A, the probe 74 intersects an edge 77 of the convex object 75 at a single point 78 (referred to herein as a line segment-edge).

In FIG. 6B, the probe 74 stays on the surface 75*a* of a plane constructed from a single or multiple polygons and the intersection between the probe and the plane is either a portion or all of it (referred to herein as a line segment-face).

As discussed above, in ray-based rendering, the generic probe of the haptic device is modeled as a line segment and detection of collisions between the line segment and 3D objects in a scene are computed to provide the interaction forces/torques. As also mentioned above, the existing haptic rendering techniques of the prior art only consider the point-based interactions that take place between the end point of the haptic device and 3D virtual objects. In the point-based case, the point probe and virtual object can only have point-vertex, point-edge, or point-polygon contacts. However, as described above in conjunction with FIGS. 6–6B, the type of contacts between the line segment model of the haptic probe and virtual object can, in addition, be line segment-edge and line segment-polygon. It should also be appreciated that there can also be multiple contacts composed of a combination of the above cases.

Because force reflection depends on the past position of the probe, to properly reflect forces to the user in haptic rendering, one must consider the history of probe's movements. One reason the history must be considered is because the direction from which the probe 75 contacts or ends up in a certain location can affect the forces exerted on the probe (and thus felt by a user holding the probe). For example, if in FIG. 6B probe 74 were embedded in the center of the object 75, the probe 74 could arrive at that position via a number of different paths. For example, probe 74 could have been forced through face 75a of object 75 (e.g. like a knife cutting through a stick of butter) or probe 74 could have entered the object 75 through face 75b (e.g. like a pin pushed into a pin cushion). Thus the manner in which the probe 74 arrived at its present position is relevant to computing forces and reflecting forces to a user. This illustrates one difference between haptic rendering and graphical rendering.

To consider the history in the ray-based interactions, it is necessary to track the probe's tip position as well as the probe's orientation. Consequently, as discussed above in conjunction with FIGS. 4A–4F, the detection of collisions between a line-segment model of a haptic probe and arbitrary shaped 3D objects (i.e. convex and concave) is relatively complicated and computationally expensive when compared with detection of collisions in systems which use only point-based interactions.

Figure 7B:
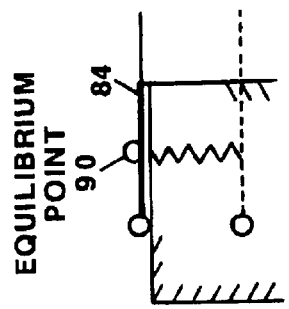
FIGS. 7–7B illustrate the location of an ideal probe relative to a virtual probe for the contact conditions shown in FIGS. 6–6B.
Figure 7A:
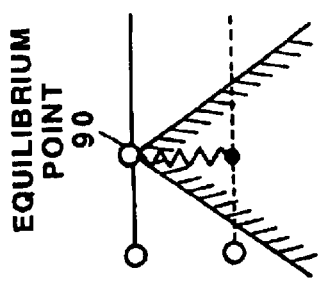
Figure 7:
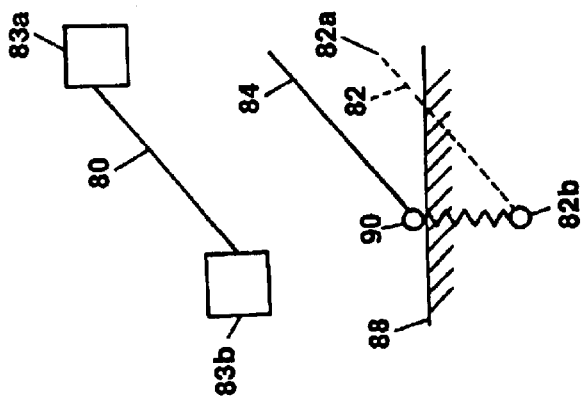

Referring now to FIG. 7, for haptic rendering of objects in VEs, in addition to collision detection, a "collision response" phase has to be considered to calculate and reflect reaction forces and torques to the user. To better describe the steps of the collision response phase, reference is made herein to three different definitions of the haptic probe: (1) a real or actual probe 80 which corresponds to the physical piece that is held by the user, (2) a virtual probe 82 which corresponds to the computational model of the probe (i.e. the line segment model) that is defined by the tip and tail coordinates of the real probe; and (3) an ideal probe 84 which corresponds to the ideal location of the virtual probe 82 that is constrained to stay on the surface when the virtual probe 82 penetrates into the object 88.

End points 82a, 82b of the line segment model of the probe 82 are defined by the end points of force feed back devices 83a, 83b coupled to the actual probe 80. The force feed back devices 83a, 83b may be provided, for example, as PHANToMs. As a user manipulates the physical probe 80 of the haptic device in the real environment, the line segment model of the probe 82 that is defined by the end points of each force feed back device 83a, 83b is updated at each servo loop. The collisions of this line segment 82 with the virtual objects 88 are then detected. Although virtual probes can be anywhere in 3D space, the movements of the ideal probe 84 are restricted such that it cannot penetrate into objects e.g. object 88. FIGS. 7–7B show the location of the ideal probe 84 relative to the virtual probe 82 for each contact condition.

To properly distribute the forces to each force feedback device 83a, 83b, the point of equilibrium 90 on the ideal probe 84 must be known. The net moment is computed according to the equilibrium point 90 to distribute the forces. The location of the equilibrium point 90 on the ideal probe changes with respect to the contact type. For example, in point-polygon collision shown in FIG. 7A, the equilibrium point coincides with the tip point of the ideal probe. On the other hand, in line segment-face contact shown in FIG. 7B, the location of this point depends upon the portion of the probe 84 that is in contact with the surface 88. The details of the collision detection and the response phases are described below.

To simply the computations, one can constrain the ray-based rendering method to handle only convex objects. In analyzing convex objects using the ray-based rendering method, a local search technique referred to as "Neighborhood Watch" that is described in Ho et al., 1999, can be employed. Finding the constrained position and orientation of the ideal probe using a localized neighborhood search makes the rendering rate independent of the number of polygons. In addition, by constructing two types of heirachical databases for each object in the scene, collisions can be rapidly detected. In this approach the two types of hierarchical databases are: (1) a bounding-box and (2) a neighborhood-connectivity hierarchical tree.

The bounding box hierarchy is used for detecting the first collision between the virtual probe and virtual objects. The neighborhood connectivity is used to perform local searches for finding the subsequent contacts, which significantly reduces the computational time. Once the contact type is identified, the reaction forces can be computed using the "collision response" method described below in conjunction with FIGS. 15–15B.

In general, the collision detection phase between the virtual probe and a virtual object is composed of two states: the probe did or did not have a collision with the object in the previous loop. Once this state in the previous loop is known, the steps described below in conjunction with FIGS. 8–13 are followed to detect the subsequent contacts.

Figure 8:
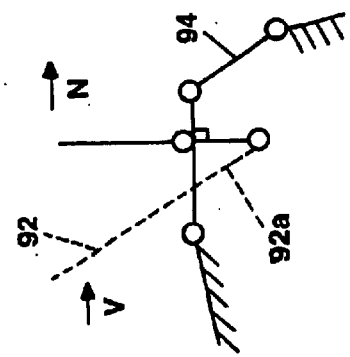
FIG. 8 illustrates a point-polygon collision in which one end of the probe is already inside the object whereas the other end point is outside the object.

If in step 106 (FIG. 5) decision is made that there was a collision in the previous loop, and if it is determined in step 108 (FIG. 5) that a point-polygon collision occurred in the previous loop, then the processing which takes place in step 110 (FIG. 5) is as explained in conjunction with FIG. 8.

Referring now to FIG. 8, a probe 92 has a first end 92a inside an object 94. Thus, a collision has been previously detected in a previous loop.

Since a collision has already been detected in another loop, the first step is thus to update the vector that defines the probe 92. A line segment that connects the end points of the probe 92 defines this vector (V) and its direction is from the end that was in contact with the object in the previous loop to the other end point. Next the dot product of V and the normal (N) of the polygon that was contacted in the previous loop is calculated.

If the dot product of the collided polygon normal (N) and the vector (V) is larger than zero (i.e. if the angle between these two vectors is less than 90 degrees), the collided end point of the probe is projected onto the plane of the previously collided polygon and then a check is made to determine if the projected point is still inside the same polygon in the current loop. The collided end point of the probe can be projected onto the plane of the previously collided polygon using the following technique. Given a point p, a plane with a unit normal $\vec{N}$ and another point $p_0$ on the plane, The projected point p' of point p on the plane can be calculated as $p' = p + ((p_0 - p) \cdot \vec{N}) \vec{N}$.

Figure 9:
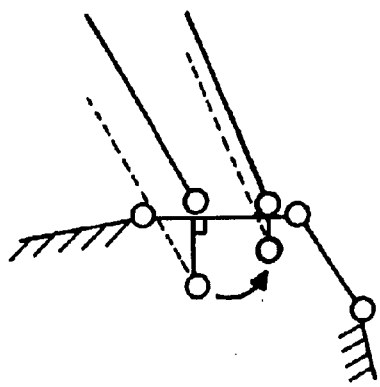
FIGS. 9–9C illustrate a series of possible contact types following a point-polygon collision.

If the projected point is still inside the same polygon in the current loop, the type of contact condition in the current servo loop is again a point-polygon collision, as shown in FIG. 9.

Figure 9B:
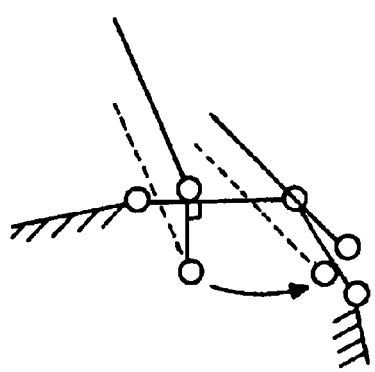
Figure 9A:
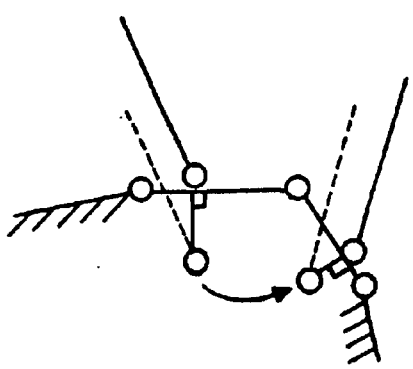

If, on the other hand, the projected point is not still inside the same polygon in the current loop, the probe 92 could have a point-polygon collision with a neighboring polygon as shown in FIG. 9A or the probe 92 could have a line segment-edge collision with a neighboring edge as shown in FIG. 9B. If the collided end point is above the surface containing the polygon, then there is no collision in the current cycle.

Figure 9C:
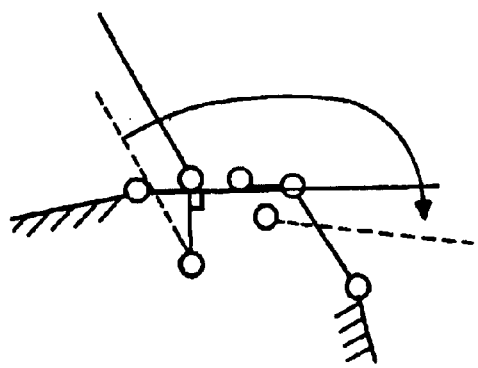

If the dot product of (N) and (V) is smaller than zero (i.e. if the angle between these two vectors is greater than 90 degrees), a line segment-face contact is encountered as shown in FIG. 9C.

Figure 10:
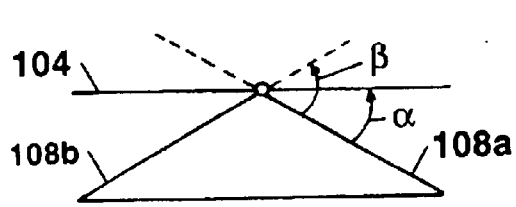
FIGS. 10–10E illustrate a series of possible collision situations following a line segment-edge contact.
Figure 10A:
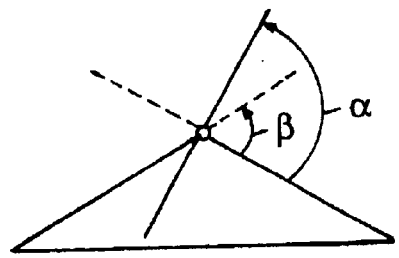

If in step 106 (FIG. 5) decision is made that there was a collision in the previous loop, and if it is determined in step 108 (FIG. 5) that a line segment-edge collision occurred in the previous loop, then the processing which takes place in step 110 (FIG. 5) is as explained in conjunction with FIG. 10.

Figure 10B:
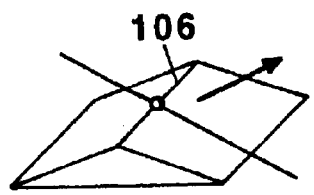
Figure 10C:
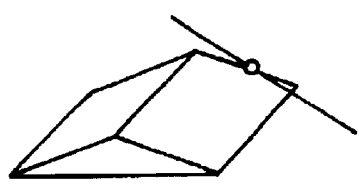
Figure 10D:
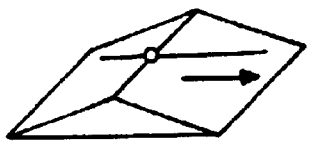
Figure 10E:
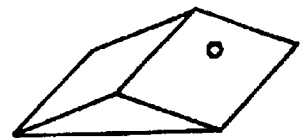

Referring now to FIGS. 10–10E, in which like elements are provided having like reference designations throughout the several views, a probe 104 is shown in various stages of contact with edges 106 and surfaces 108.

If there is a line segment-edge collision in the previous loop, then a projection of the probe on a plane which contains the previously contacted edge and whose normal is perpendicular to the probe is first found. The projection of the probe on a plane which contains the previously contacted edge can be found using the following technique. Two line segments $(P_a, P_b)$ and $(P_c, P_d)$ are defined in the 3D space. A vector $(\vec{N})$ that is perpendicular to the two line segments $(P_a, P_b)$ and $(P_c, P_d)$ (i.e. cross product of two vectors $(P_a, P_b)$ and $(P_c, P_d)$) is found and normalized. The plane parallel to the line segment $(P_a, P_b)$ and containing the line segment $(P_c, P_d)$ will have the unit normal $\vec{N}$ and the point $P_c$. The line segment $(P_a, P_b)$ is projected onto this plane and the projected line segment $(P_a', P_b')$ is obtained.

The line segment $(P_a, P_b)$ can be projected onto the plane using the following technique. Given a line segment $(P_a, P_b)$, a plane with a unit normal $\vec{N}$ and another point $p_0$ on the plane, the goal is to calculate the projected line segment $(P_a', P_b')$ of the line segment $(P_a, P_b)$ on the plane. The point $P_a$ is projected to the plane and the projected point $P_a'$ is obtained. In the same way, the projected point $P_b'$ of the point $P_b$ can be obtained. Then, the line segment $(P_a', P_b')$ is the projection of the line segment $(P_a, P_b)$ on to the plane.

The points $P_a, P_b$ can be projected onto the plane to obtain the projected points $P_a', P_b'$ using the following technique. Given a point p, a plane with a unit normal $\vec{N}$ and another point $p_0$ on the plane, The projected point p' of point p on the plane can be calculated as $p'=p+((P_0-p)\cdot\vec{N})\vec{N}$.

After the projection of the probe on a plane which contains the previously contacted edge and whose normal is perpendicular to the probe is found as described above, a determination is made as to whether the projected probe has an intersection with the previously collided edge or not. In addition to this check, two angles α and β are defined to describe the collision status of the probe 104 with the edge 106 as shown in FIG. 10. Each edge primitive in the database has two neighboring polygons. The angle β is the angle between the first polygon 108a (arbitrarily chosen) and the extension of the second polygon 108b as shown in FIG. 10. Similarly, the angle α is the angle between the first polygon 108a and the probe 104.

If the value of α is larger than zero and smaller than the value of β and the projection of the probe (computed in the same manner as described above) has an intersection with the edge of the object, the probe should still be in contact with the same edge. If the probe is above the edge, then there is no contact.

If the value of α is larger than zero and smaller than the value of β and the projection of the probe (computed in the same manner as described above) does not have an intersection with the edge, the probe 104 should either have a line segment-edge collision as shown in FIGS. 10B, 10C, a point-polygon collision as shown in FIGS. 10D, 10E, or no collision at all in the upcoming loop.

If the value of α is smaller than zero or larger than the value β, it can be inferred that the probe has a line segment-face contact with a neighboring face.

Figure 11:
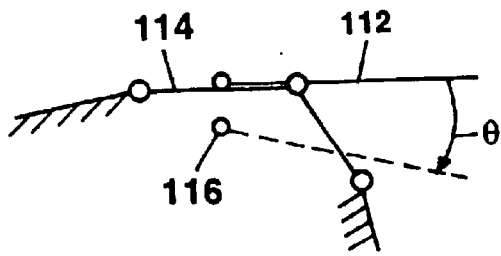
FIG. 11 illustrates a line segment-face collision.

Referring now to FIG. 11, the processing which takes place if there was a line segment-face collision in the previous loop is explained.

The cases where the tip of the probe penetrates into the object (point-polygon) and the probe collides with the edge of the object (line segment-edge) have been discussed above. However, there is a situation, for example, where a part of a probe 112 may be on a surface 114 of an object 116. Or, when the surface of a convex object is touched with the tip of a probe and then the probe is rotated around the contacted polygon in continuous contact. In these cases, first a single-point contact occurs (point-polygon), then the probe becomes parallel to the contacted surface of the object.

The phase described in these examples is referred to as line segment-face where the term "face" refers to the face that is constructed from the collided polygon (i.e. since the probe lies on the surface of the object, it could be in contact with multiple polygons). For the detection of line segment-face contact, an angle θ that is between the probe and the face 114 is first defined. Next a determination is made as to whether the projection of the probe 112 on the plane of the face 114 still has a collision with the face or not.

To make such a determination, the following technique may be used. Given a line segment $(P_a, P_b)$, a plane with a unit normal $\vec{N}$ and another point $p_0$ on the plane, the goal is to calculate the projected line segment $(P_a', P_b')$ of the line segment $(P_a, P_b)$ on the plane. One may project the point $P_a$ to the plane and obtain the projected point $P_a'$ as $p'=p+((p_0-p)\cdot\vec{N})\vec{N}$ in p is the point, $\vec{N}$ is the unit normal on a plane and $p_0$ is another point on the plane. In the same way, one can obtain the projected point $P_b'$ of the point $P_b$. Then, the line segment $(P_a', P_b')$ is the projection of the line segment $(P_a, P_b)$ on to the plane.

If the value of θ is smaller than a user defined small angle epsilon (set at, say, 1°) and the projection of the probe (computed as explained above) has a collision with the face, the probe should be in contact with the same face. If the probe is above face then there is no contact.

Referring now to FIGS. 12 and 12A, if the value of θ is larger than epsilon and the projection of the line probe (computed as explained above) has a collision with the face, the type of contacts can be a point-polygon as shown in FIG, 12 and line segment-edge as shown in FIG. 12A, or no collision at all.

Referring now to FIG. 13, if the projection of the probe, which can be computed in a manner described above, does not have a collision with the face, the path of the probe is traced to find out the direction in which the probe moves to move out of face. Based on this direction, one can determine whether the probe has a point-polygon collision, a line segment-edge collision, or no collision at all.

To determine the type of contact, one can use the direction of the movement in the following manner. If the probe moves out of the face from an edge, a determination is made as to whether the end points of the probe are below the neighboring polygon of this edge. If so, then there is a point-polygon collision as shown in FIG. 13. Otherwise there is no collision.

On the other hand, if the probe moves out of the face through a vertex, a determination is made as to whether the probe is below any of the neighboring edges of the vertex as shown in FIG. 13A. If so, then there is a line segment-edge collision. To quickly determine the unqualified edges (i.e. a vertex can have multiple number of neighboring edges) with which the probe cannot possibly collide, an imaginary plane is considered. This plane contains the vertex in consideration and its normal is determined using the closest vector from the vertex to the projected probe (i.e. the probe is projected to the plane of face). If the neighboring edges of the vertex are behind this imaginary plane, then they are not considered for a possible collision.

Referring now to FIG. 14, the collision response processing begins with step 132 in which the type of contact is determined. Once the type of contact is determined, processing proceeds to step 134 in which the processing for the specific type of contact is performed. The particular processing is described below in conjunction with steps 15-15B. After the appropriate processing is completed, processing proceeds to step 136 in which an appropriate haptic response is provided to the user. Processing then ends.

In haptic rendering, the collision response involves the computation of the ideal probe relative to its virtual counterpart and the reaction forces/torques that arise from the interactions with 3D objects. Although the collision response phase has been studied in computer graphics, its implementation to haptics shows some differences as pointed out in Ho et al., 1999.

In particular, the differences relate to the location of the ideal probe relative to the current location of the virtual probe and the computation of forces and torques that will be displayed to the user. With respect to the location of the ideal probe relative to the current location of the virtual probe, the probe that is held by the user is free to move anywhere in 3D space until its motion is constrained by force feedback or workspace boundary of the device. Since the virtual probe is allowed to penetrate into objects for the purpose of detecting collisions, it is necessary to compute the location and orientation of the ideal probe for the calculation of forces/torques as discussed above in conjunction with FIG. 7.

With respect to the computation of forces and torques that will be displayed to the user, during haptic interactions with virtual objects, the computer sends force commands to the haptic device. This prevents the user from further penetrating into the objects. The forces and torques are computed based on the differences in the locations of the virtual and ideal probes.

The computation of ideal probe location and the interaction force depends on the type of contact. Each contact case is studied in detail below in conjunction with FIGS. 15-15B.

Figure 15B:
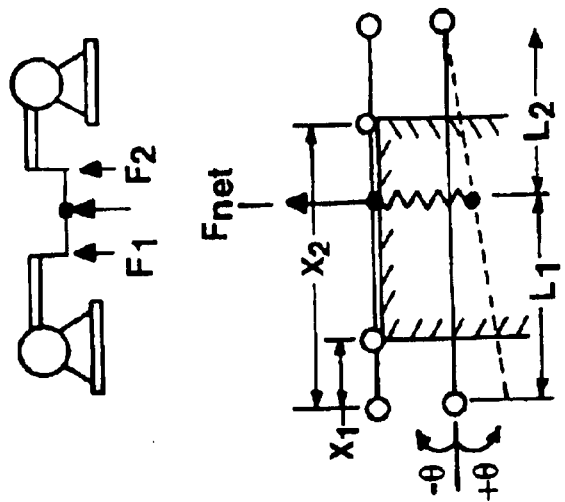
FIGS. 15–15B illustrate the ideal location of the probe in the collision response for ray-based haptic rendering in the case of point-polygon, line segment-edge, or line segment-face types of collisions.
Figure 15A:
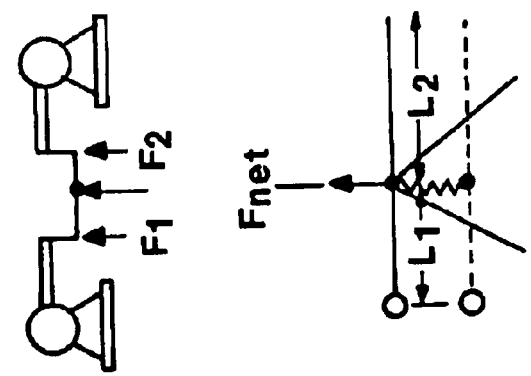
Figure 15:
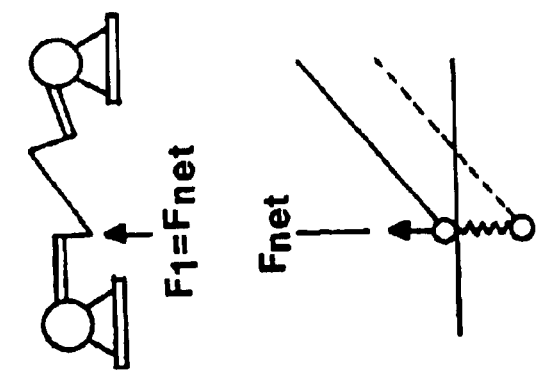

Referring now to FIGS. 15-15B in which like elements are provided having like reference designations throughout the several views, in point-polygon collision (FIG. 15), first the surface point on the collided polygon that is nearest to the end point of the virtual probe is found. Then, the virtual probe is projected to this nearest surface point to define the new position of the ideal probe while keeping its orientation the same as the virtual probe. Following the projection, the nearest surface point and the end point of the ideal probe coincides. This nearest surface point is called the equilibrium point in FIGS. 7-7B since it enables one to compute interaction forces and torques. It is assumed that there is a virtual spring between the contacted end points of the virtual and ideal probes as shown in FIG. 15. The forces and torques are then computed based on the spring constant and the position difference between the virtual and ideal probes as described in Ho et al., 1999.

Referring now to FIG. 15A, in a line segment-edge collision, the plane that contains the collided edge and is parallel to the virtual probe is first found. The virtual probe is projected to this plane using the techniques described above in conjunction with FIGS. 13-13C to define the new position of the ideal probe. Next the intersection point of the collided edge and the ideal probe is computed. This intersection point is called the equilibrium point in FIG. 7A. To compute the net interaction force, one assumes that there is a virtual spring between the virtual and ideal probes as shown in FIG. 15A. The net force is then distributed to two Phantoms or other force feedback systems to display the forces to the user. The force reflected from each PHANToM is inversely proportional to the distance from the PHANToM in consideration to the collision point and may be expressed as shown in Equation 1:

$$F_1 = \frac{L_2}{L} F_{net} \quad F_2 = \frac{L_1}{L} F_{net} \tag{1}$$

where, L is the total length of the probe ($L_1+L_2$), $F_1$ and $F_2$ are the forces reflected from PHANToM devices, and $F_{net}$ is the force coming from the virtual spring.

Referring now to FIG. 15B, in a line segment-face collision, a part of the ideal probe lies on the surface of the object while the virtual one penetrates into the object. If the user rotates the probe even slightly, the type of contact may quickly change to point-polygon or line segment-edge. This is undesirable since it can cause instability. For this reason, the orientation of the probe relative to the object surface (angle θ in FIG. 12) plays an important role in computing the equilibrium point where the net force is acting. One first determines the contour points of the face that collides with the probe. It should be noted that in FIG. 15B the probe intersects the contours of the face at two points which are marked as A and B. Next, the distances from one end of the probe to these points ($x_1$ and $x_2$ in FIG. 15B) are computed. Now, one can compute the location of the collision point where the net force is acting in a manner described by Equation 2:

$$L_1 = \left(\frac{x_1 + x_2}{2}\right) + \left(\frac{\theta}{\theta_{epsilon}}\right)\left(\frac{x_1 - x_2}{2}\right) \tag{2}$$

where, $L_2=L-L_1$ and the angle θ is defined as the current orientation of the probe relative to its ideal orientation and it varies between $-\theta_{epsilon}$ and $\theta_{epsilon}$. In several simulations, $\theta_{epsilon}$ was chosen as one degree.

For example, observe the collision response phases in FIG. 15B: If θ is equal to $\theta_{epsilon}$, then $L_1$ becomes equal to $x_1$ and equilibrium point moves to the point A and the contact phase switches to line segment-edge. Similarly, if θ is equal to $-\theta_{epsilon}$, then $L_1$ becomes equal to $x_2$. The equilibrium point moves to the point B and contact phase switches to line segment-edge. For θ between $-\theta_{epsilon}$ and $\theta_{epsilon}$, $L_1$ will have a value between $x_1$ and $x_2$.

Following the computation of $L_1$ and $L_2$, the force that will be reflected from each PHANToM can be easily determined using Eq. (1).

Figure 16:
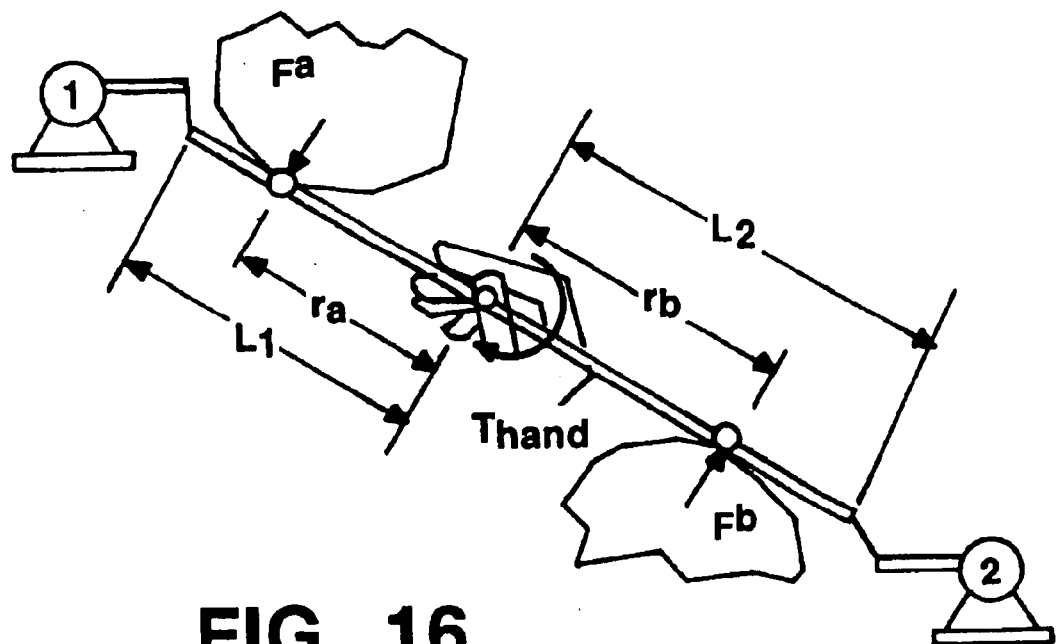
FIG. 16 illustrates the computation of interaction forces/torques when the line probe interacts with two virtual objects.

Referring now to FIG. 16, in the computations described above in conjunction with FIGS. 15-15B, the net torque from the two PHANToMs is equal to zero since the collision is described for a single object. However, the user may feel torques as well as the forces when there are multiple objects to interact in the scene and the movement of the probe is constrained.

For example, if there are two convex objects and the user attempts to touch both of them at the same time as it is schematically described in FIG. 16, a certain amount of torque and force will be felt. The net force ($F_{net}$) that will be reflected to the user's hand under this situation will be the vector summation of the forces $F^a$ and $F^b$ as shown in FIG. 16. The net torque acting on the user's hand can be computed as shown in Equation 3:

$$T_{hand} = F^a r^a + F^b r^b \qquad (3)$$

The component of the force $F^a$ that will be reflected from PHANToM-1 and PHANToM-2 can be computed using Equation 4 below:

$$F_1^a = \frac{L_2 + r^a}{L} F^a \qquad F_2^a = \frac{L_1 - r^a}{L} F^a \qquad (4)$$

Similarly, the force $F^b$ is distributed between the two Phantom devices as shown by Equation 5:

$$F_1^b = \frac{L_2 - r^b}{L} F^b \qquad F_2^b = \frac{L_1 + r^b}{L} F^b \qquad (5)$$

Figure 17A:
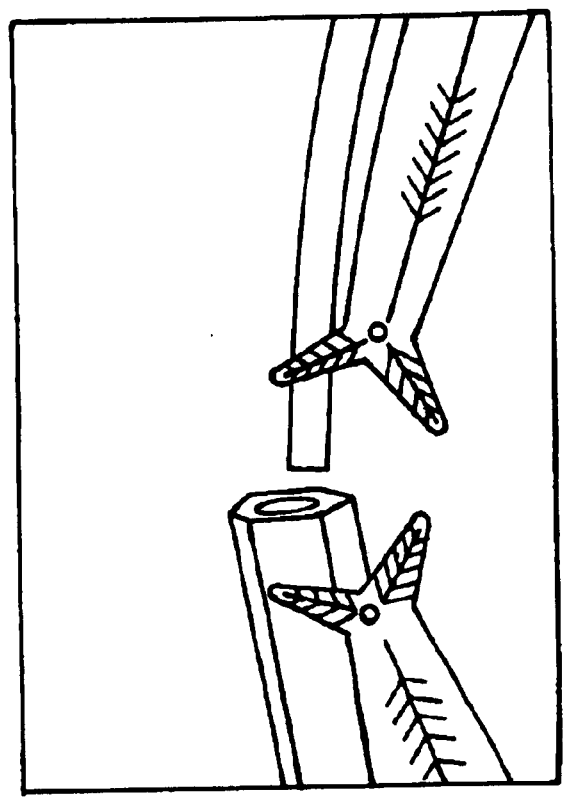
FIG. 17A illustrates haptic interactions between surgical instruments and flexible objects in which a surgical instrument is modeled as three line segments.
Figure 17:
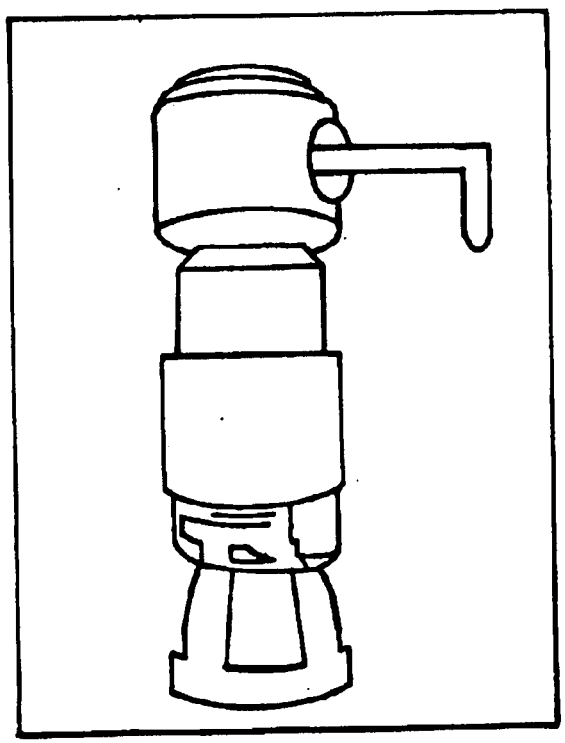
FIG. 17 illustrates haptic interactions between a mechanical tool and an engine block in which the engine block is made of convex objects and the mechanical tool is modeled as two line segments.

Referring now to FIG. 17 an engine block made of convex objects is simulated using the ray-based rendering technique of the present invention. A mechanical tool or probe is modeled as a pair of line segments. A user manipulating a real tool can thus feel the torque applied to the virtual tool as the tool is engaged in the engine block. The forces/torques are computed separately for each segment and are combined such that only a single force/torque is represented to the user who holds the tool.

Referring now to FIG. 17A a flexible object made of convex objects is simulated using the ray-based rendering technique of the present invention. A surgical tool or probe is modeled as three line segments. A user manipulating the surgical tool can thus feel the torque and forces applied to the surgical tool as the tool engages the flexible object. Again, the forces/torques are computed separately for each line segment and combined such that a realistic force/torque can be represented to a user.

The ray-based rendering technique of the present invention can be superior to the point-based techniques in many applications. If one needs to explore an interior surface of an object where visual cues are limited or if the interaction torques are important in executing a task as in assembly planning and design, one can take advantage of the ray-based rendering. Moreover, the ray-based rendering technique of the present invention can be considered as an intermediate stage in progress towards a full 6-DOF haptic rendering. Since modeling of the haptic interactions between arbitrary shaped 3D objects is computationally too expensive (especially in interacting with dynamical or deformable objects with a 3D haptic probe), an intermediate step for rendering both forces and torques will be helpful. For example, the computational model of a 3D mechanical tool can be easily constructed from a few line segments as shown in FIG. 18A. Such modeling of the haptic interactions between arbitrary shaped 3D objects using the intermediate step for rendering both forces and torques can be used to achieve faster haptic rendering rates. Real time update rates for rendering dynamical and deformable objects using the ray-based rendering have been achieved using the present invention. It would not be possible to provide such real time updates if full 3D object-object interactions were used.

All references cited herein are hereby incorporated herein by reference in their entirety.

Having described preferred embodiments of the invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

What is claimed is:

1. A haptic interface system having a probe represented as a ray in a virtual environment having at least one object represented therein, the haptic interface system comprising:
   a probe position processor for tracking the past and present positions of the probe;
   a collision detection processor for receiving probe position information from said probe position processor and for determining whether any portion of the probe contacts the at least one object in the virtual environment, said collision detection processor including means for detecting one or more side collisions between the probe and the at least one object to enable a user to feel forces arising from side interactions between the probe and the at least one object in the virtual environment;
   a mechanics interaction processor for receiving information from said collision detection processor and for computing an appropriate reaction force vector based on the penetration depth of the ray into the at least one object represented in the virtual environment;
   a force mapping processor for receiving information from said mechanics interaction processor and for modifying the reaction force vector computed by said mechanics interaction processor by appropriately mapping the reaction force vector over a surface of the object;
   a motor command processor for receiving the modified reaction force vector from said force mapping processor and for providing a reaction force to the user through the probe; and
   a storage device and wherein said probe position processor includes means for storing information related to the past positions of the probe in the storage device.

2. The haptic interface system of claim 1 further comprising an encoder coupled to said probe wherein in response to a user manipulating the probe the encoder senses the position and orientation of the probe.

3. The haptic interface system of claim 1 further comprising:
   a materials database having stored therein information and characteristics of the materials from the at least one object in the virtual environment is made; and
   a geometric database having stored therein information and characteristics of the geometric shape of the at least one object in the virtual environment and wherein said mechanics interaction processor is coupled to said materials database and said geometric database and uses the information in said materials database and said geometric database to compute the reaction force vector.

4. The haptic interface system of claim 1 wherein:
   said collision detection processor is coupled to said geometric database and said collision detection processor uses the information in said geometric database to determine whether any portion of the probe contacts the at least one object in the virtual environment; and said force mapping processor is coupled to said geometric database and said force mapping processor uses the information in said geometric database to modify the reaction force vector.

5. A haptic interface system for use in a system which includes a force reflection device having a probe and a display for displaying an object in a virtual environment, the haptic interface system comprising:

means for representing the probe as a ray having a length in the virtual environment;

means for determining and tracking the position and orientation of the ray; and means, coupled to said means for determining and tracking the position and orientation of the ray, said means for detecting collisions between the ray and the object in the virtual environment and for providing control signals to the force reflection device such that the force reflection device provides to a user forces which are representative of forces arising from interactions between the ray and the object in the virtual environment wherein the control signals provided by said means take into account the tracking and the orientation information of the ray, wherein said means for representing the probe as a ray having a length includes:

means for defining a probe tip coordinate;

means for defining a probe tail coordinate; and means for connecting the probe tip coordinate to the probe tail coordinate by one or more lines; and said means for detecting collisions between the ray and the object in the virtual environment and for providing signals to the force reflection device includes means for returning a collision point corresponding to an intersection between the ray and a surface of the object and wherein said means for connecting the probe tip coordinate to the probe tail coordinate by one or more lines includes means for connecting the probe tip coordinate to the probe tail coordinate with a plurality of straight line segments which together form a set of lines which is not a straight line.

6. The haptic interface system of claim 5 further comprising:

means for computing a reaction force for each of the plurality of straight line segments;

means for combining the reaction force computed for each of the plurality of straight line segments; and means for reflecting to a user the sum total of the forces computed by said means for combining.

7. The haptic interface system of claim 5 wherein said means for combining the reaction forces comprises:

means for detecting multiple collisions between the ray and one or more objects in the virtual environment; and means for summing the forces resulting from each collision;

means for computing a torque; and means for conveying to a user the torque computed by said means for computing a torque.

8. The haptic interface system of claim 5 further wherein said means for determining and tracking the probe position and orientation of the ray comprises:

an encoder; and means for transmitting and receiving encoder signals to and from the haptic interface.

9. A force reflection system comprising:

first and second force feedback devices;

a probe having a first end coupled to the first force feedback device and a second end coupled to the second force feedback device such that the force reflection system displays to a user forces in three axes;

probe representation means for representing the probe as a ray having a length in a virtual environment such that a first end of the ray corresponds to the first end of the probe and a second end of the ray corresponds to the second end of the probe; and means, coupled to said first and second force feedback devices, for detecting collisions between at least a portion of the ray other than an end point of the ray and an object in the virtual environment and for providing signals to said first and second force feedback devices such that the first and second force feedback devices allow a user to feel forces arising from interactions between the ray and the object in the virtual environment; and means for representing objects in a virtual environment as convex objects.

10. The force reflection system of claim 9 further comprising means for displaying to the user torques about two axes.

11. The force reflection system of claim 9 wherein said means for detecting collisions between at least a portion of the ray and an object comprises means for detecting collisions between at least a portion of the ray and a convex object.

12. The force reflection system of claim 9 wherein the ray corresponds to a simulated probe and the system further comprises:

means for representing the probe as an ideal probe which follows the trace of the simulated probe and wherein the simulated probe can penetrate the objects, but the ideal probe is constrained to stay on the surface of the object and to be always parallel to the simulated probe.

13. The force reflection system of claim 12 further comprising:

first spring coupling means coupled between the tip of the simulated probe and the tip of the ideal probe; and second spring coupling means coupled between the tail of the simulated probe and the tail of the ideal probe for computing torque in addition to the forces to be displayed to the users.

14. The force reflection system of claim 13 wherein further comprising:

a geometric database having stored therein characteristics and primitives which define a geometric shape of each object in the virtual environment and wherein said means for detecting collisions and providing signals is coupled to said geometric database; and means for determining whether the simulated probe contacted a primitive and for determining whether the contacted primitive is a polygon or a line.

15. The force reflection system of claim 14 wherein said probe representation means comprises:

means for defining a probe tip coordinate;

means for defining a probe tail coordinate; and means for connecting the probe tip coordinate to the probe tail coordinate by one or more lines.

* * * * *

UNITED STATES PATENT AND TRADEMARK OFFICE
CERTIFICATE OF CORRECTION

| | |
|---|---|
| PATENT NO. | : 6,704,694 B1 |
| APPLICATION NO. | : 09/418715 |
| DATED | : March 9, 2004 |
| INVENTOR(S) | : Cagatay Basdogan et al. |

It is certified that error appears in the above-identified patent and that said Letters Patent is hereby corrected as shown below:

Column 2, line 8 delete "For example voxel-based" and replace with --For example, voxel-based--.

Column 2, line 45 delete "as line" and replace it with --as a line--.

Column 2, line 47 delete "arrangement a" and replace it with --arrangement, a--.

Column 2, line 49 delete "including but not limited to" and replace it with --including but not limited to,--.

Column 2, line 49 delete "point" and replace it with --point,--.

Column 4, line 54 delete "as finite" and replace it with --as a finite--.

Column 4, line 57 delete "return the" and replace it with --return to the--.

Column 4, line 62 delete "in addition" and replace it with --, in addition,--.

Column 5, line 8 delete "Rather" and replace it with --Rather,--.

Column 5, line 41 delete "regard the" and replace --regard, the--.

Column 5, line 54 delete "user feel" and replace it with --user to feel--.

Column 6, line 6 delete "including but not limited to" and replace it with --, including but not limited to,--.

Column 6, line 25 delete "tissue)." And replace it with --tissue.--.

Column 6, line 47 delete "point-" and replace it with --point--.

Column 6, line 61 delete "model if" and replace it with --model, if--.

Column 7, line 52 delete "including but not limited to" and replace it with --, including but not limited to,--.

Column 7, line 59 delete "herein the" and replace it with --herein, the--.

Column 8, line 5 delete "including but not limited to" and replace it with --, including but not limited to,--.

UNITED STATES PATENT AND TRADEMARK OFFICE
CERTIFICATE OF CORRECTION

| | |
|---|---|
| PATENT NO. | : 6,704,694 B1 |
| APPLICATION NO. | : 09/418715 |
| DATED | : March 9, 2004 |
| INVENTOR(S) | : Cagatay Basdogan et al. |

It is certified that error appears in the above-identified patent and that said Letters Patent is hereby corrected as shown below:

Column 8, line 22 delete "reasons a" and replace t with --reasons, a--.

Column 8, line 36 delete "physically" and replace it with --physically- --.

Column 9, line 6 delete "though" and replace it with --through--.

Column 9, line 9 delete "for example" and replace it with --, for example,--.

Column 10, line 38 "objects" and replace it with --object--.

Column 11, line 3 delete "point-" and replace it with --point--.

Column 11, lines 44-45 delete "computer assisted" and replace it with --computer-assisted--.

Column 12, line 43 delete "of course" and replace it with --, of course,--.

Column 12, line 43 delete "diagram" and replace it with --diagrams--.

Column 13, line 20 delete "with and any" and replace it with --with any--.

Column 13, line 63 "stylus one" and replace it with --stylus, one--.

Column 15, line 48 delete "step 108 the type" and replace it with --step 108, the type--.

Column 16, line 41 delete "triangle for" and replace it with --triangle the--.

Column 16, line 64 delete "object the" and replace it with --object, the--.

Column 17, line 28 delete "$1_{cd}$" and replace it with --$1_{cd}$.--.

Column 17, line 40 delete "a vector ($\vec{N}$) that" and replace with --a vector ($\bar{N}$) that--.

Column 17, line 53 delete "$P_a'$ the" and replace it with --$P_a'$, the--.

Column 18, line 3 delete "general three" and replace it with --general, three--.

Column 18, line 28 delete "including but not limited to" and replace it with --, including but not limited to,--.

UNITED STATES PATENT AND TRADEMARK OFFICE
CERTIFICATE OF CORRECTION

PATENT NO. : 6,704,694 B1
APPLICATION NO. : 09/418715
DATED : March 9, 2004
INVENTOR(S) : Cagatay Basdogan et al.

It is certified that error appears in the above-identified patent and that said Letters Patent is hereby corrected as shown below:

Column 19, line 67 delete "7B," and replace it with --7C,--.

Column 20, line 5 delete "To simply" and replace it with --To simplify--.

Column 20, line 15 delete "approach the" and replace it with --approach, the--.

Column 20, line 44 delete "Next the" and replace it with --Next, the--.

Column 20, line 58 delete ", The" and replace it with --, the--.

Column 21, line 42 delete "on to" and replace it with --onto--.

Column 21, line 46 delete ", The" and replace it with --, the--.

Column 21, line 47 delete " $p' = p + ((P_o - P)\vec{N})\vec{N}$ . " and replace with -- $p' = p + ((P_o - p)\vec{N})\vec{N}$ . --.

Column 22, line 9 delete "value B," and replace it with --value of B,--.

Column 22, line 42 delete "on to" and replace it with --onto--.

UNITED STATES PATENT AND TRADEMARK OFFICE
CERTIFICATE OF CORRECTION

PATENT NO. : 6,704,694 B1
APPLICATION NO. : 09/418715
DATED : March 9, 2004
INVENTOR(S) : Cagatay Basdogan et al.

It is certified that error appears in the above-identified patent and that said Letters Patent is hereby corrected as shown below:

Column 24, line 6 delete "Next the" and replace it with --Next, the--.

Column 25, line 24 delete "FIG. 17 an" and replace it with --FIG 17, an--.

Column 25 line 33 delete "FIG. 17A a" and replace it with --FIG. 17A, a--.

Column 26, line 47 delete "probe the" and replace it with --probe, the--.

Signed and Sealed this

Seventeenth Day of October, 2006

JON W. DUDAS
*Director of the United States Patent and Trademark Office*